US009252580B2

(12) United States Patent
Cordova et al.

(10) Patent No.: US 9,252,580 B2
(45) Date of Patent: Feb. 2, 2016

(54) COPPER WIRE THEFT PROTECTION METHOD AND APPARATUS FOR WALL-MOUNTED PULL BOXES

(71) Applicants: Carlos J. Cordova, Los Angeles, CA (US); Sammy Vargas, Rosemead, CA (US)

(72) Inventors: Carlos J. Cordova, Los Angeles, CA (US); Sammy Vargas, Rosemead, CA (US)

(73) Assignee: CORBAS MARKETING, INC. A CALIFORNIA CORPORATION, Los Angeles, CA (US)

( * ) Notice: Subject to any disclaimer, the term of this patent is extended or adjusted under 35 U.S.C. 154(b) by 376 days.

(21) Appl. No.: 13/713,472

(22) Filed: Dec. 13, 2012

(65) Prior Publication Data

US 2014/0165368 A1   Jun. 19, 2014

(51) Int. Cl.
*H02G 1/00* (2006.01)
*H02G 3/04* (2006.01)
*H02G 3/12* (2006.01)
*F16B 5/02* (2006.01)

(52) U.S. Cl.
CPC .............. *H02G 3/121* (2013.01); *F16B 5/0208* (2013.01); *H02G 2200/10* (2013.01); *Y10T 29/49963* (2015.01)

(58) Field of Classification Search
CPC ........ F16B 5/0208; H02G 3/121; H02G 3/14; H02G 3/283; H02G 3/386; Y10T 29/49963
See application file for complete search history.

(56) References Cited

U.S. PATENT DOCUMENTS 5,831,212 A * 11/1998 Whitehead et al. ............. 174/50

* cited by examiner

*Primary Examiner* — Alexander P Taousakis
(74) *Attorney, Agent, or Firm* — William L. Chapin

(57) ABSTRACT

A kit and method for preventing theft or wires interconnected within a pull box of the type which is mounted in a concrete wall or other such concrete body includes a steel cover plate having a downwardly protruding pair of locking tubes that receive the upstanding shanks of a pair of studs anchored in the concrete body. Each locking tube includes a spring which urges locking pins extending upwards from a floating locking plate through perforations through a fixed locking plate into bores in the lower face of a novel locking collar-nut threaded onto a stud to fasten it to the lid, thus locking the nut from being unthreaded from the stud.

37 Claims, 34 Drawing Sheets

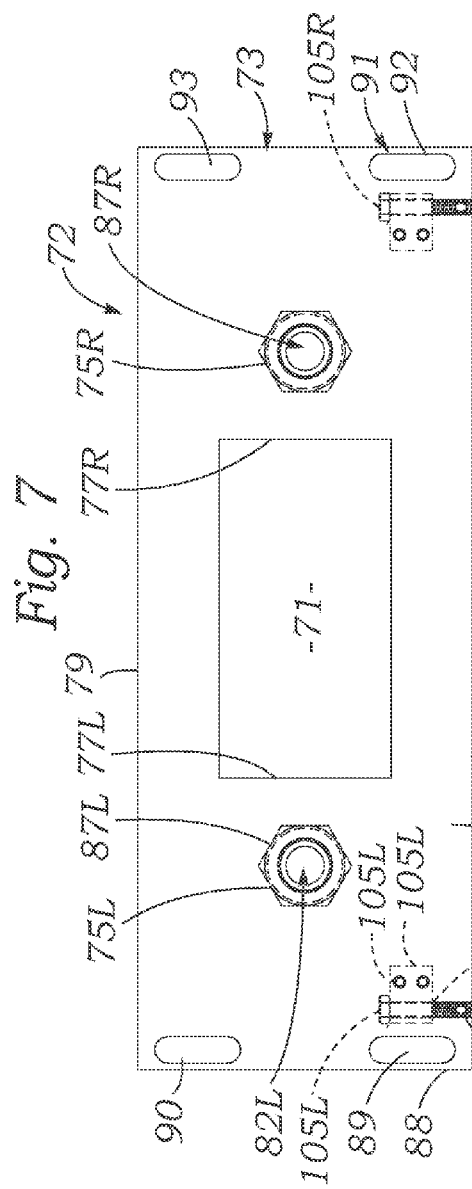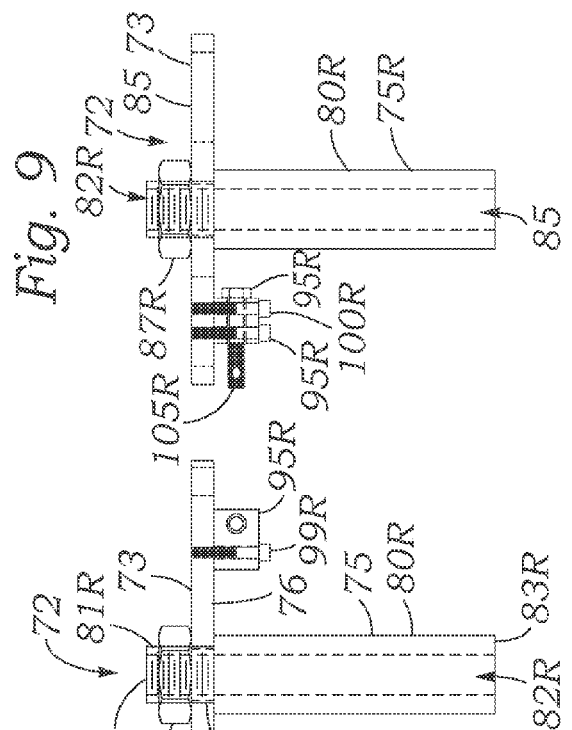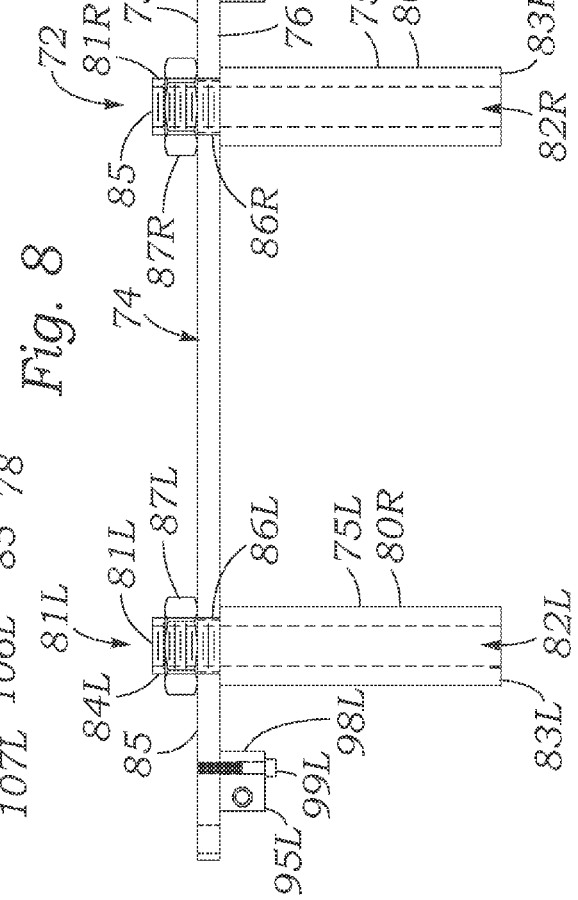

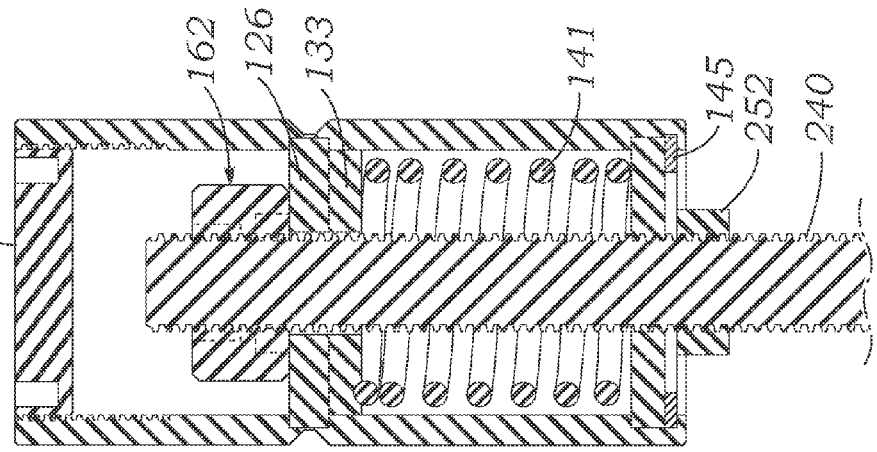
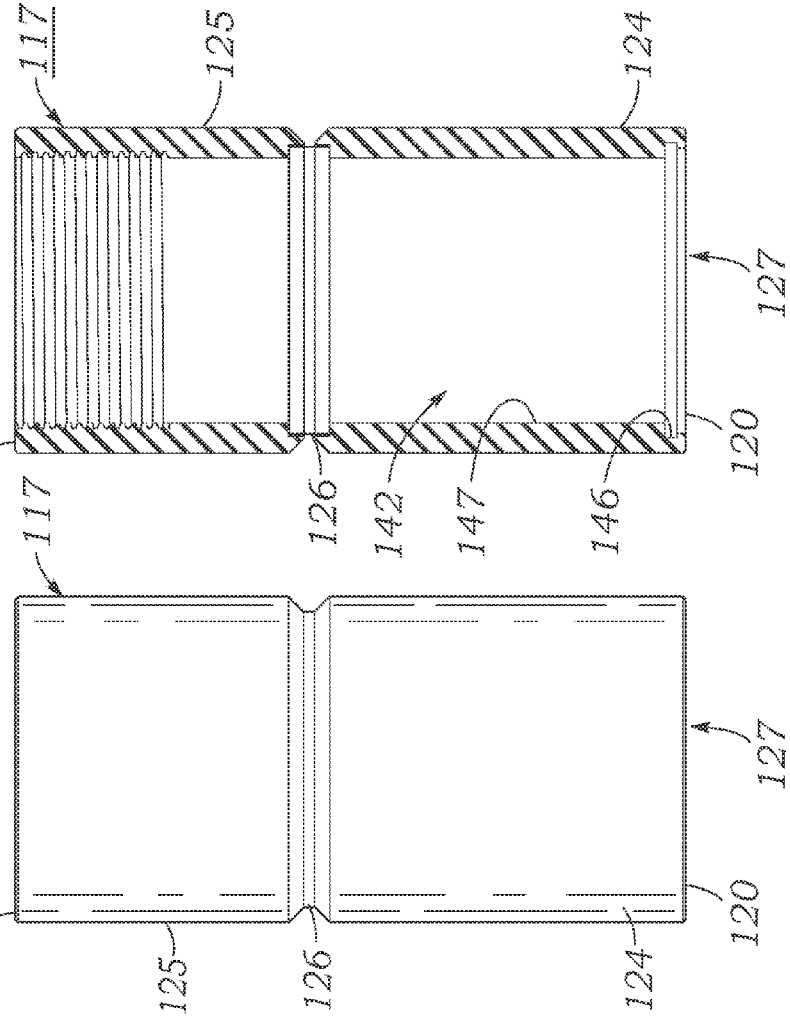
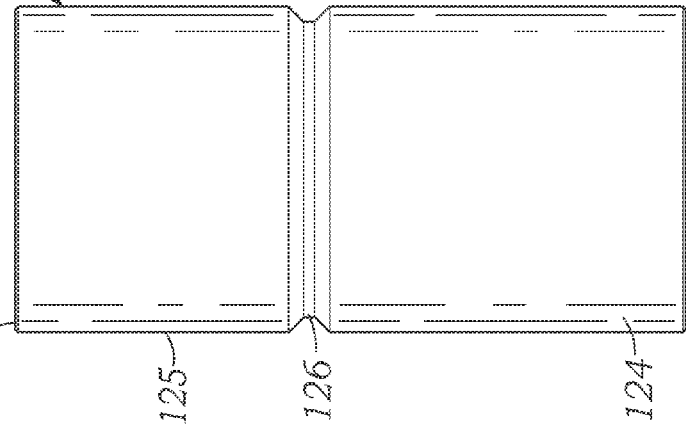

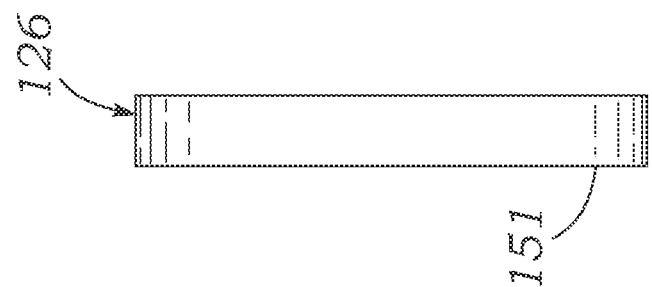
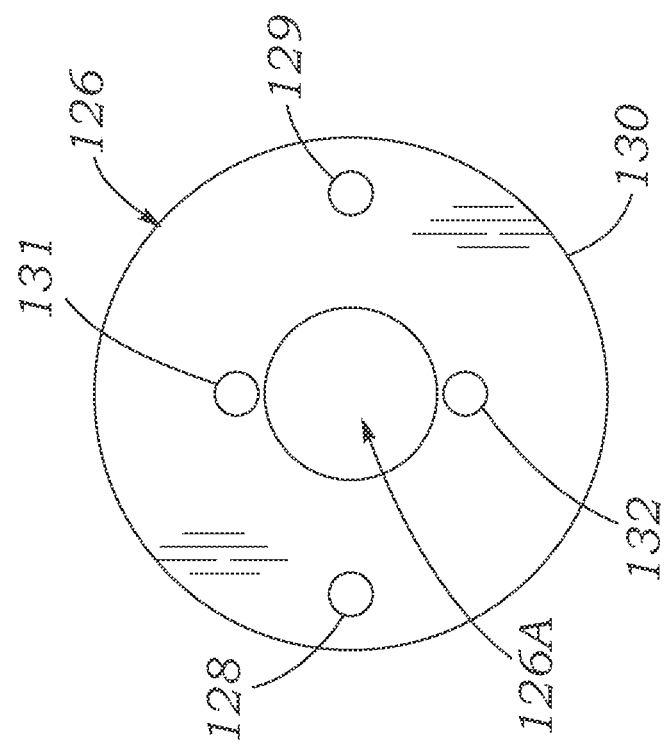

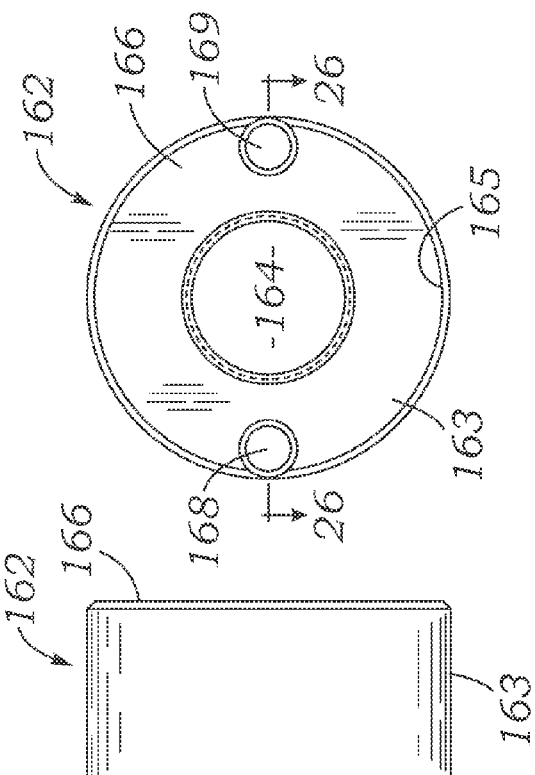
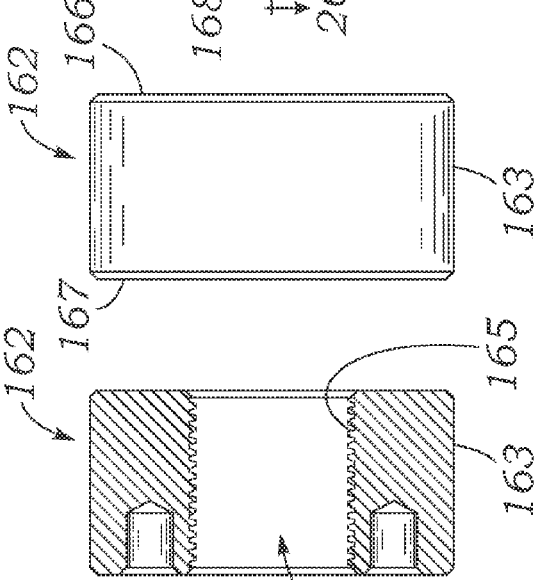
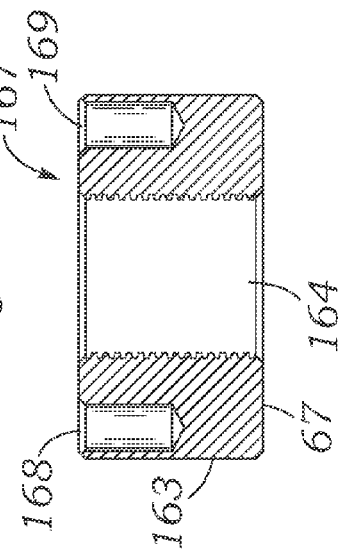
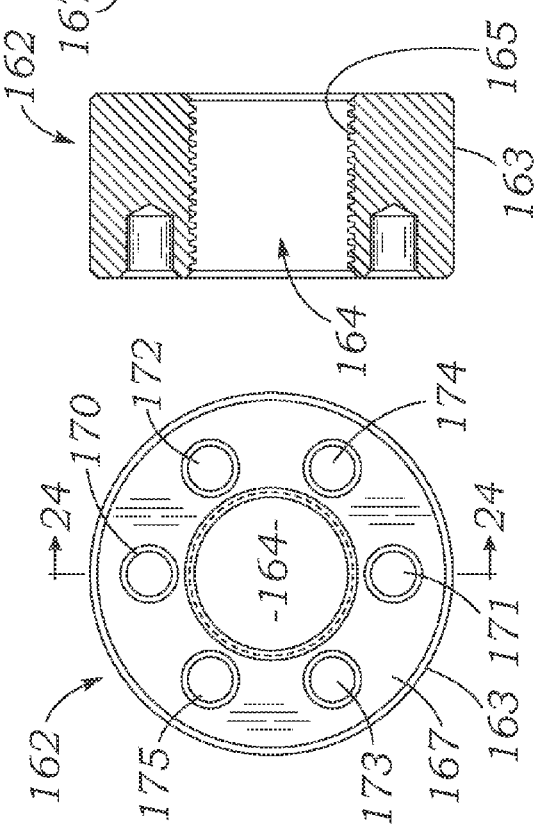

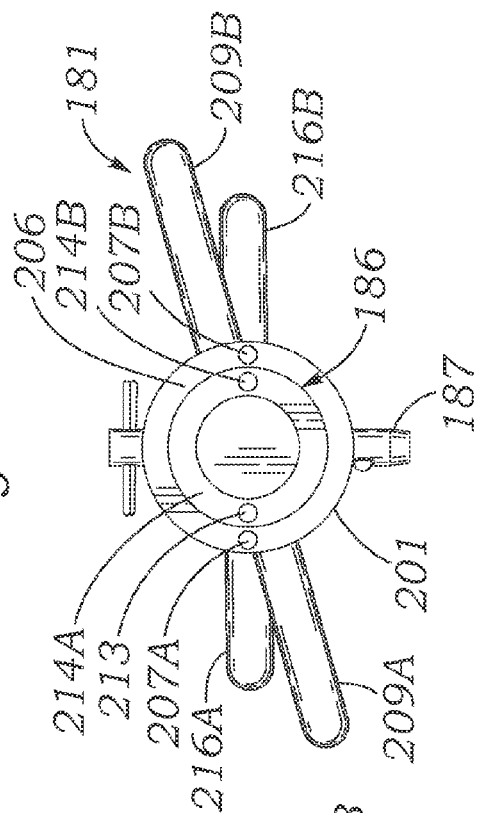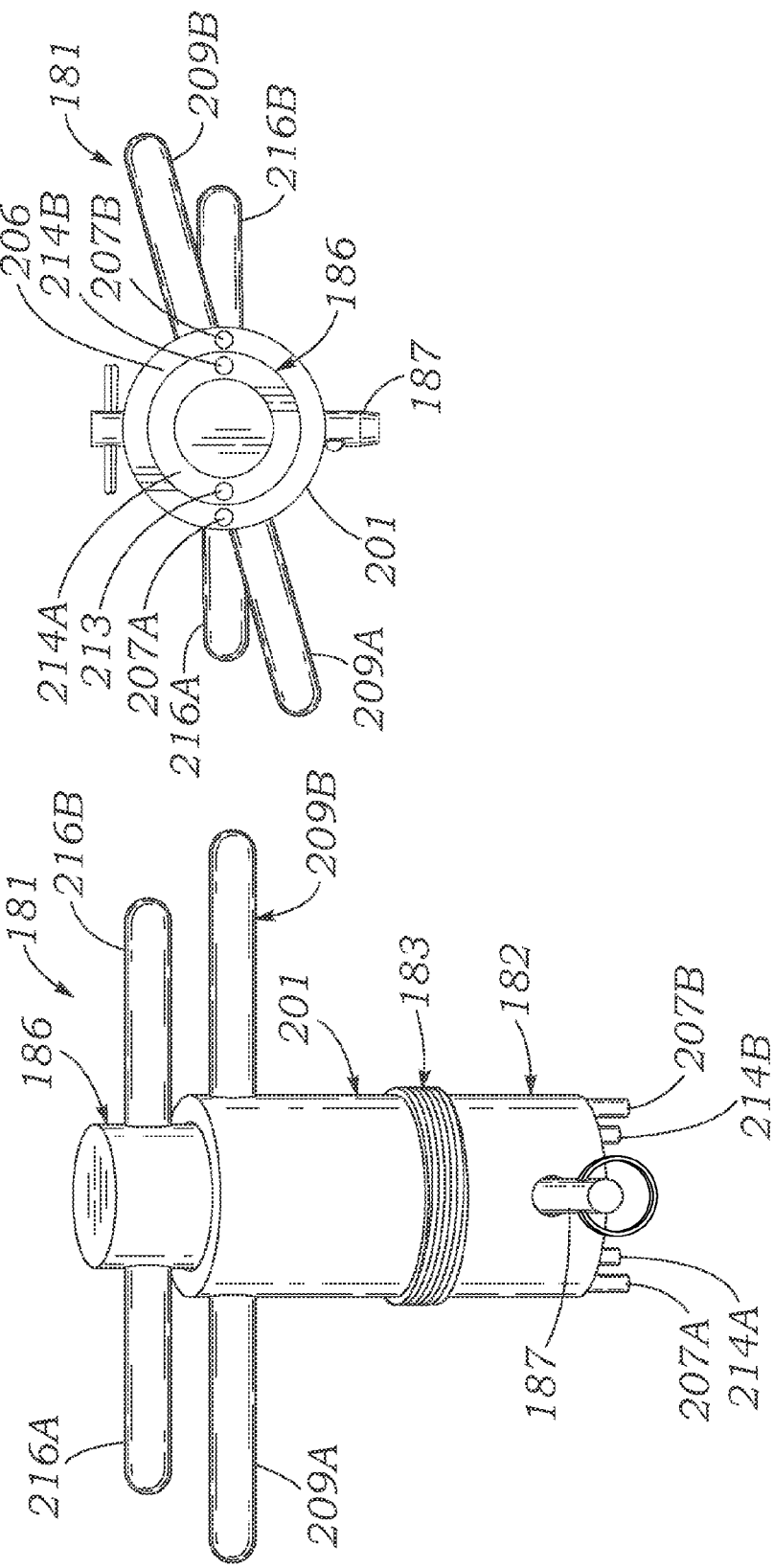

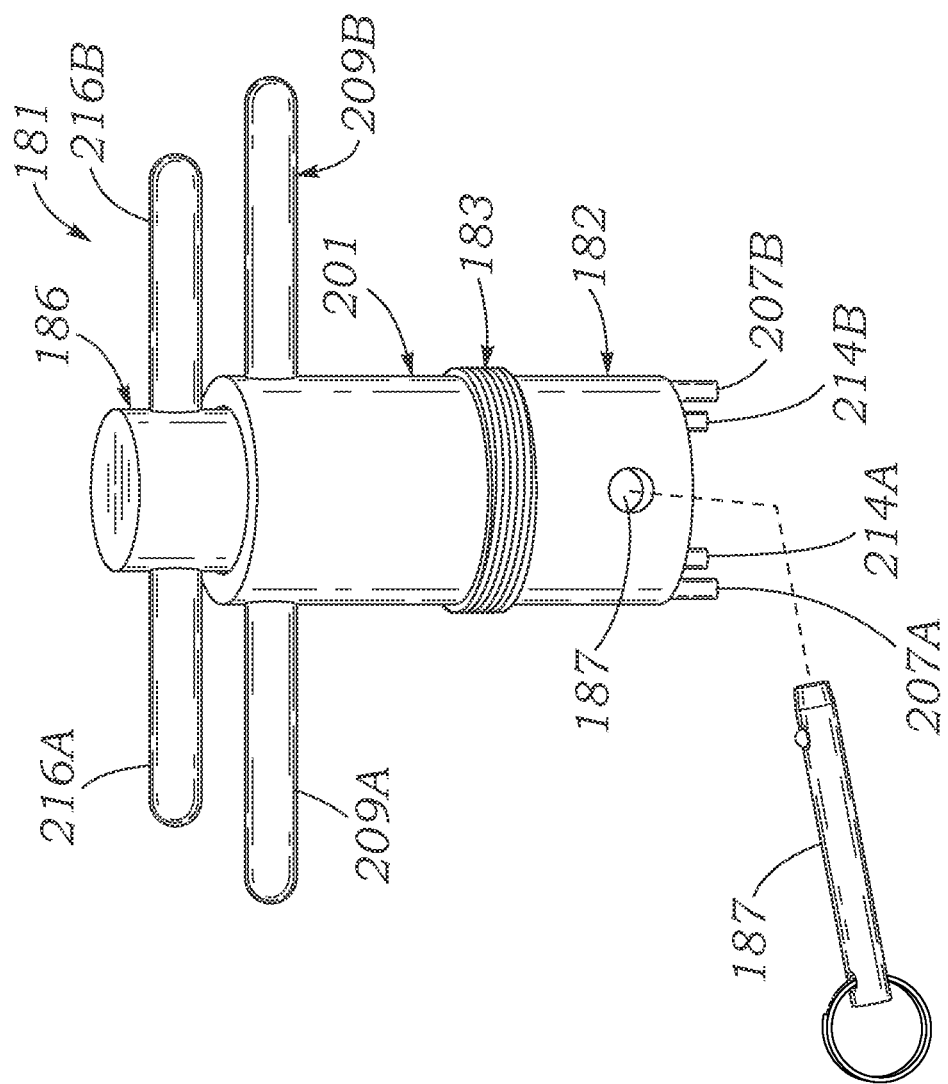

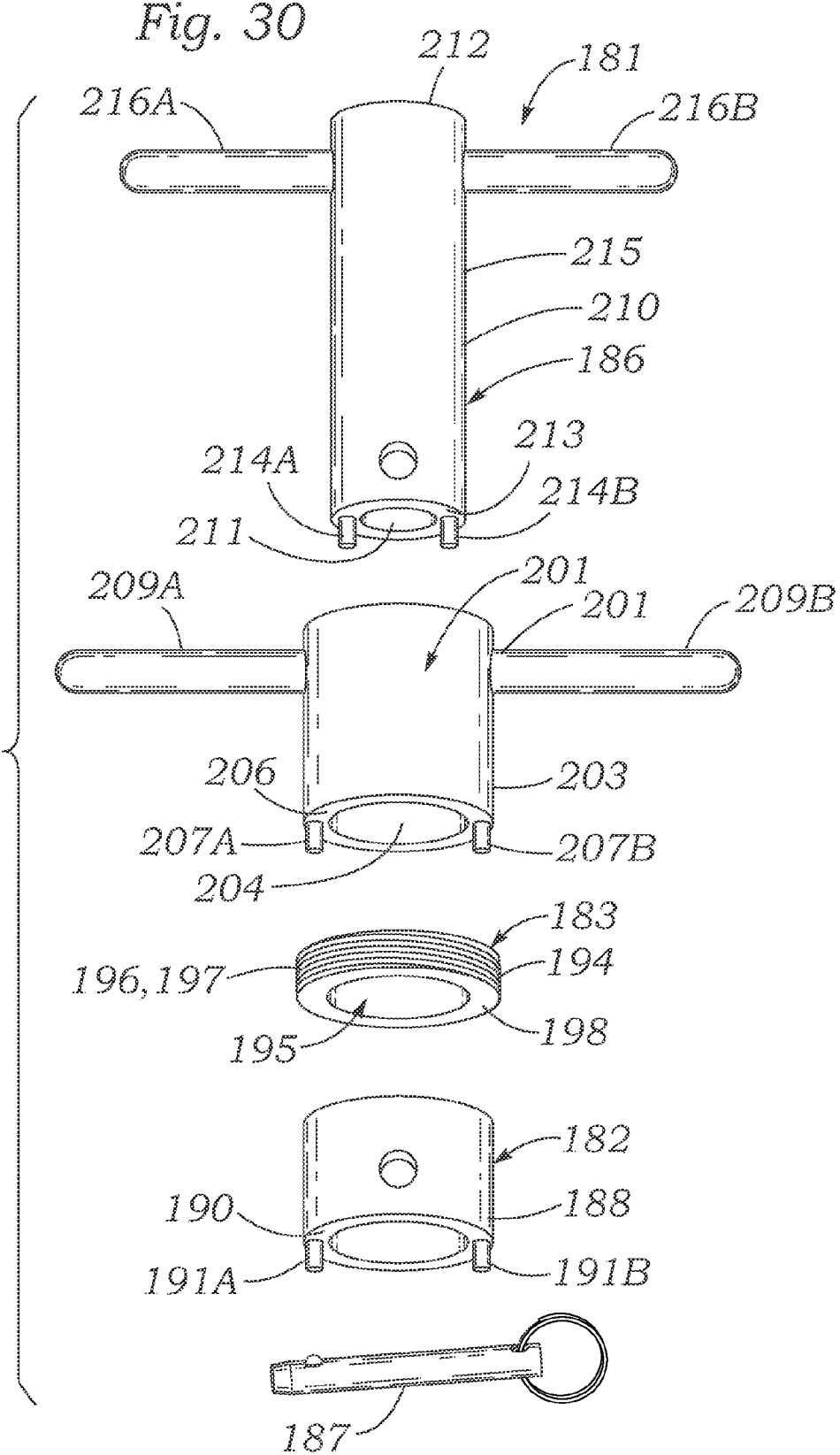

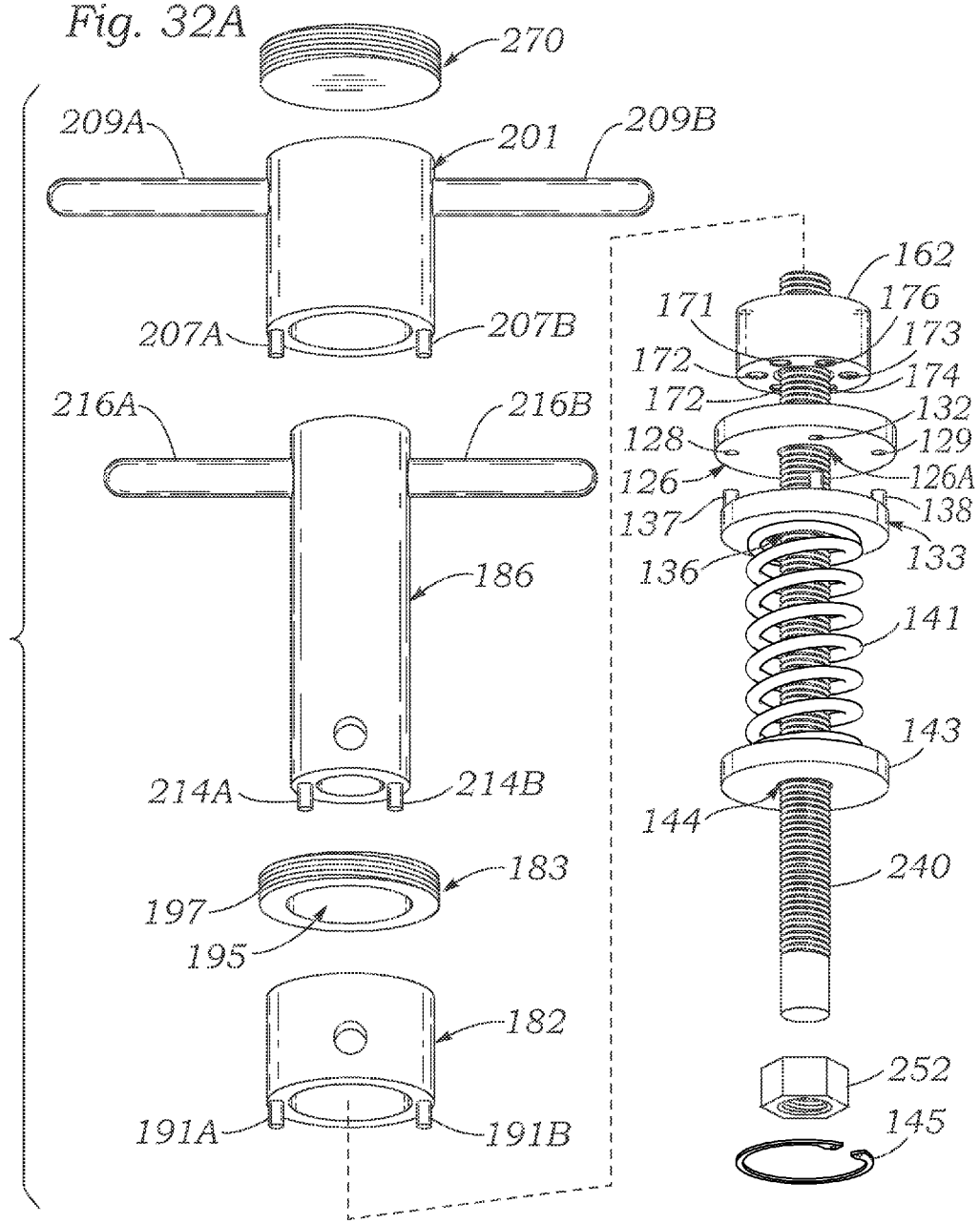

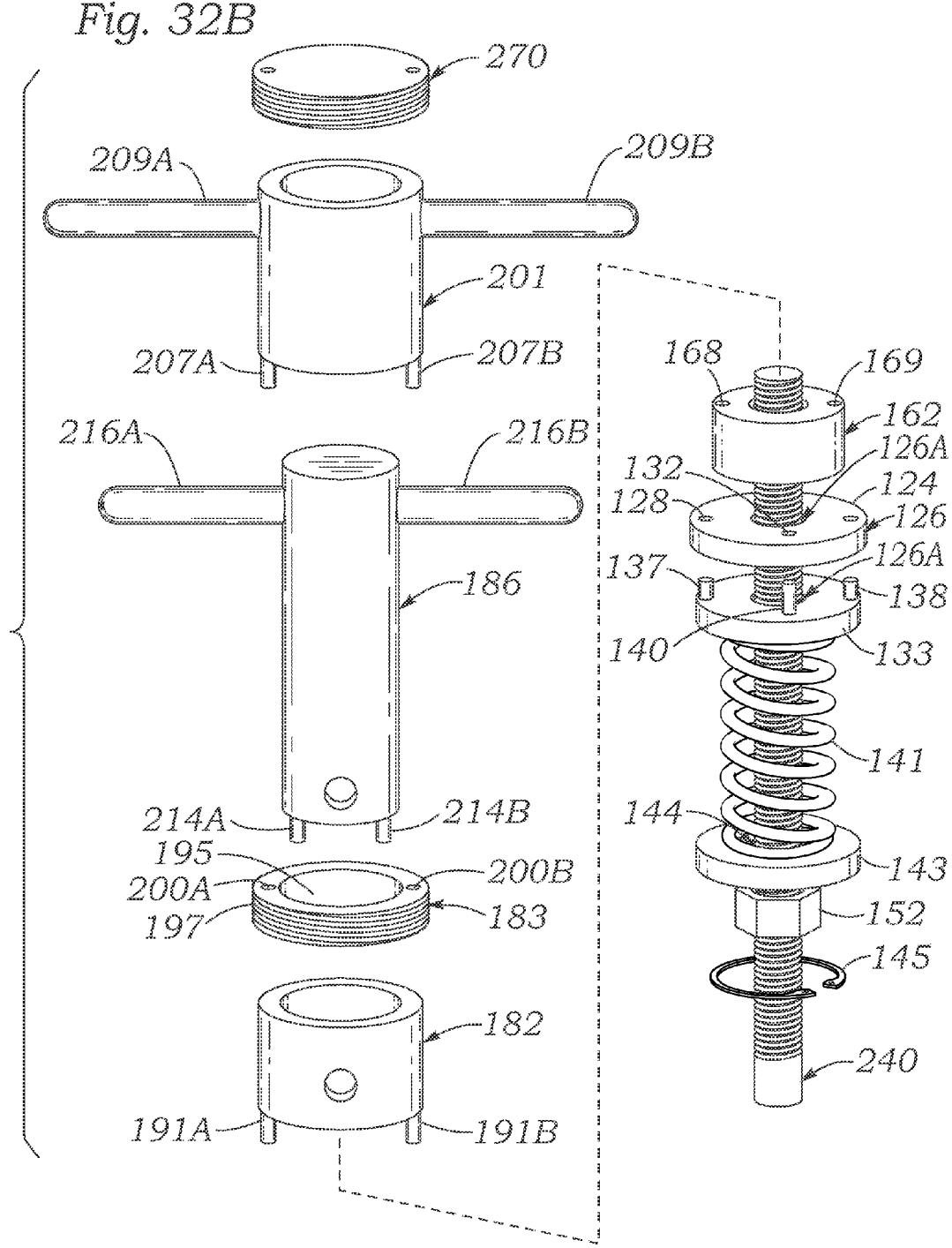

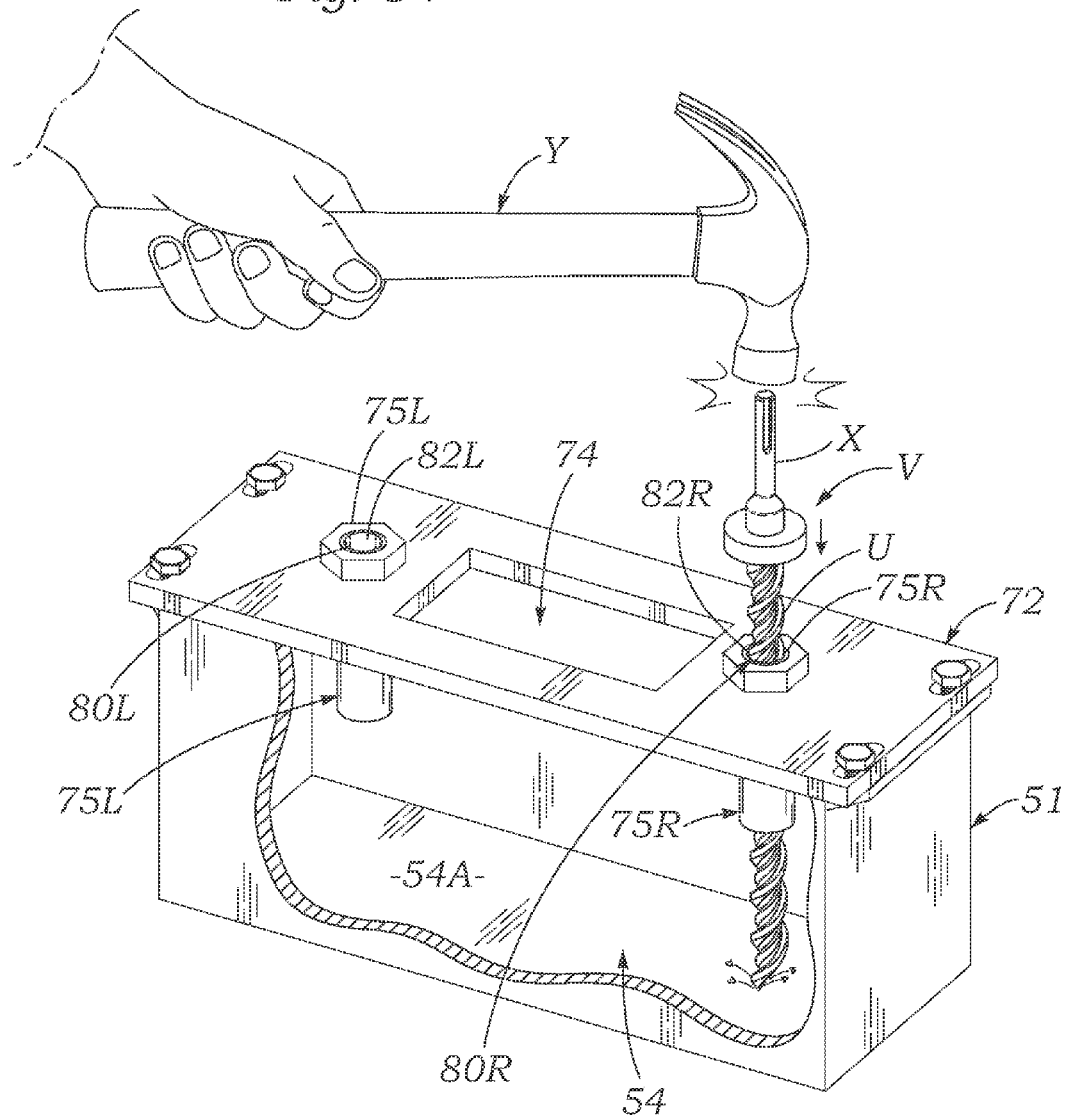

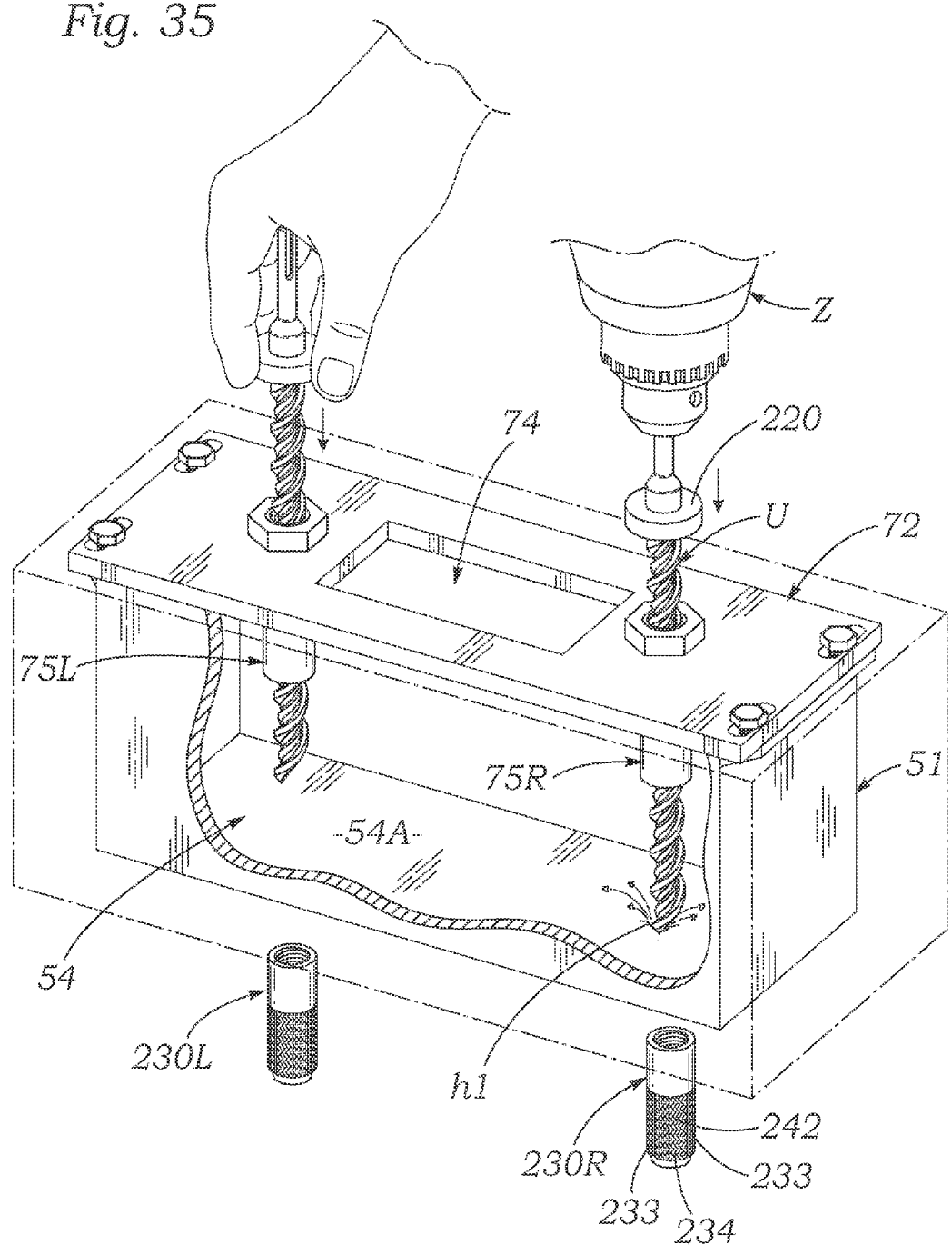

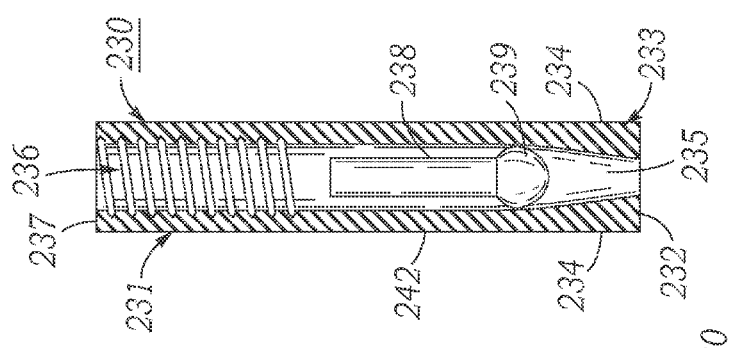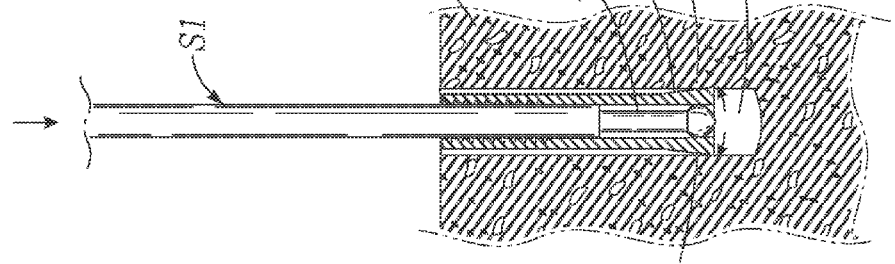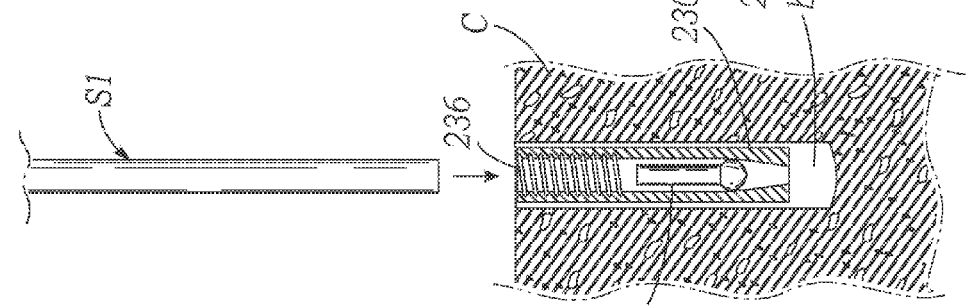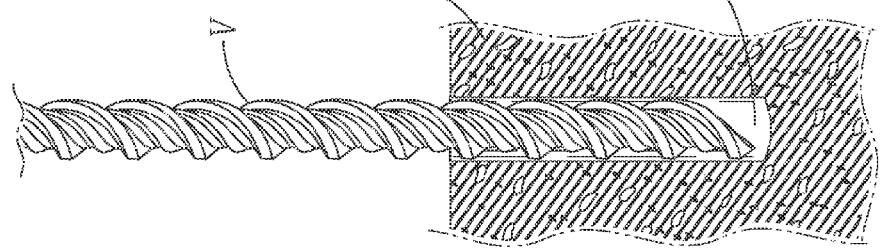

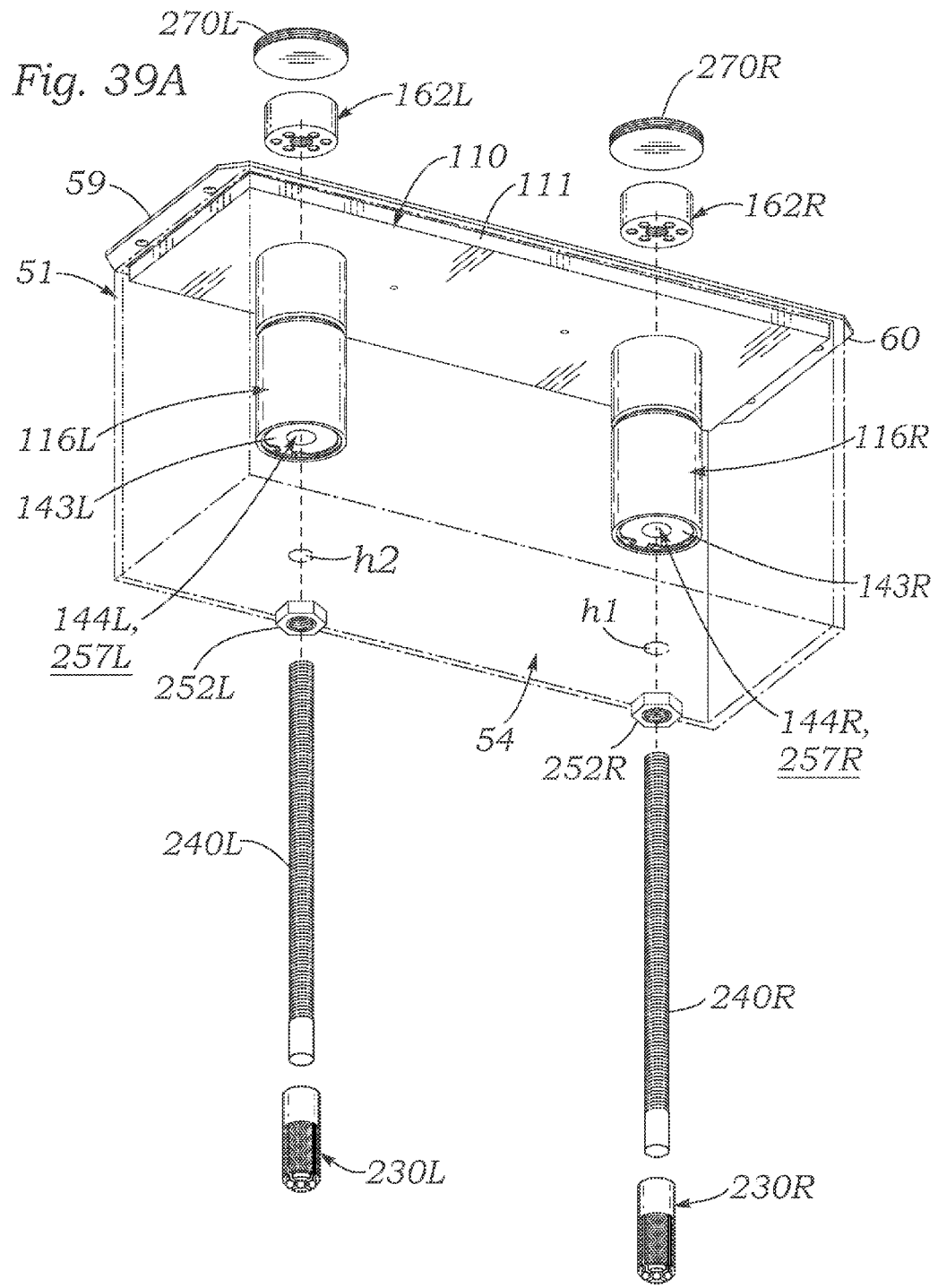

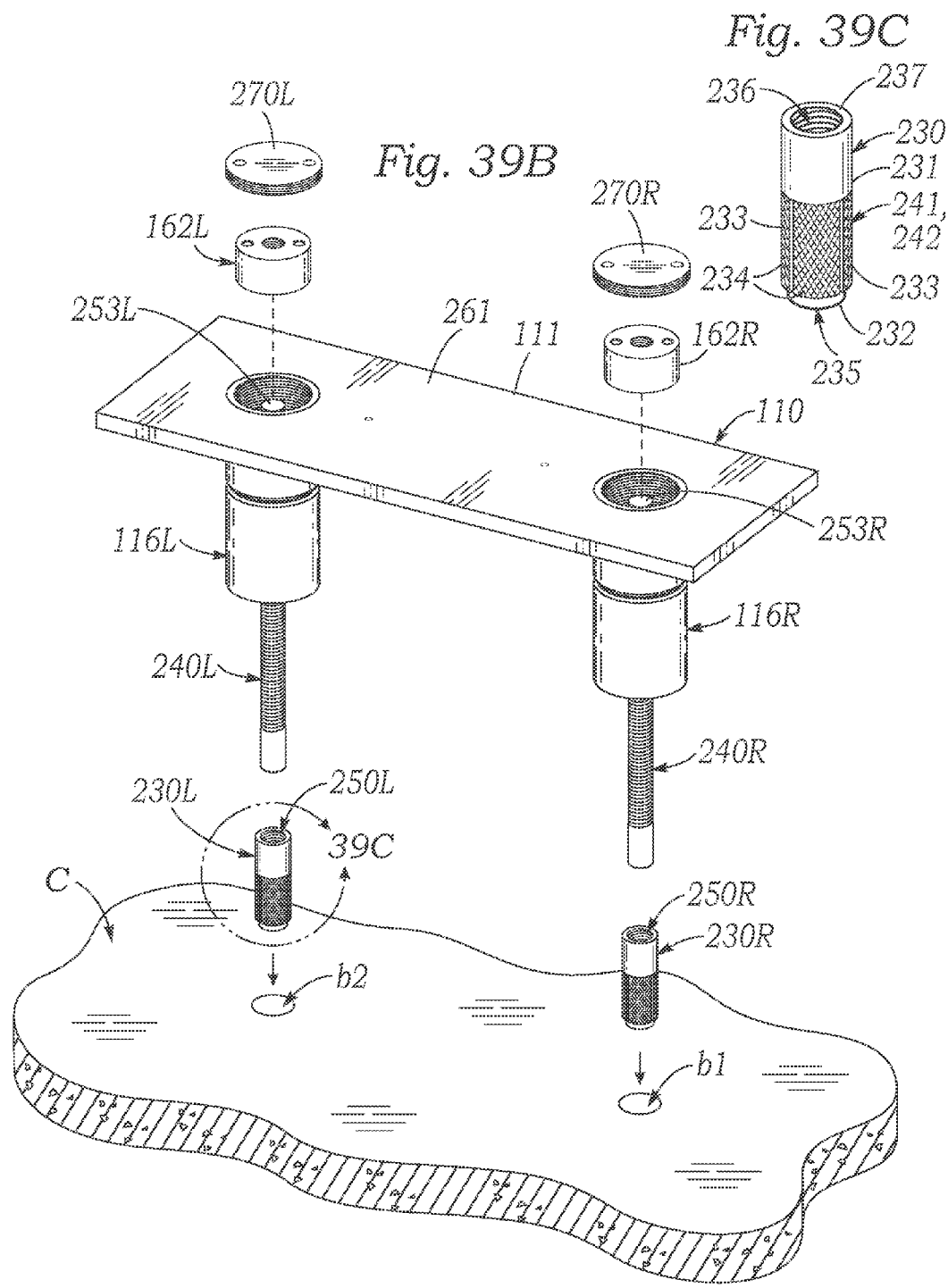

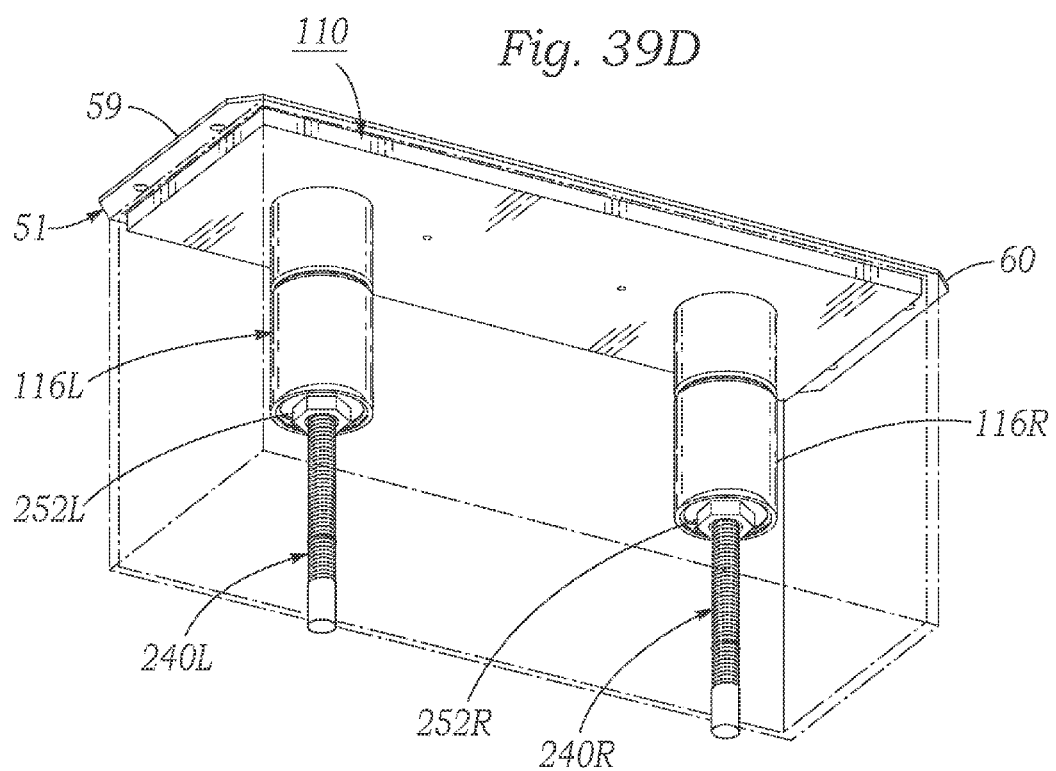

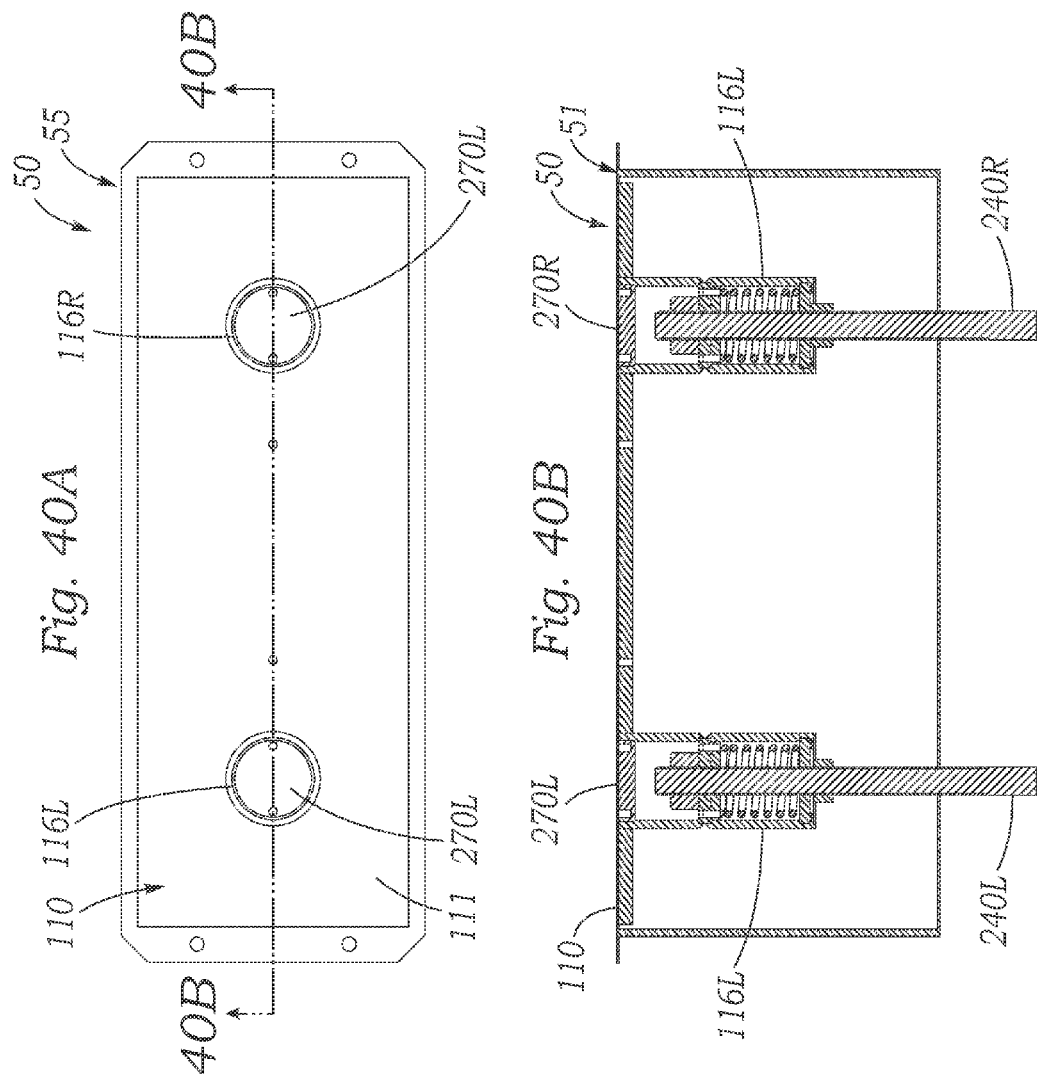

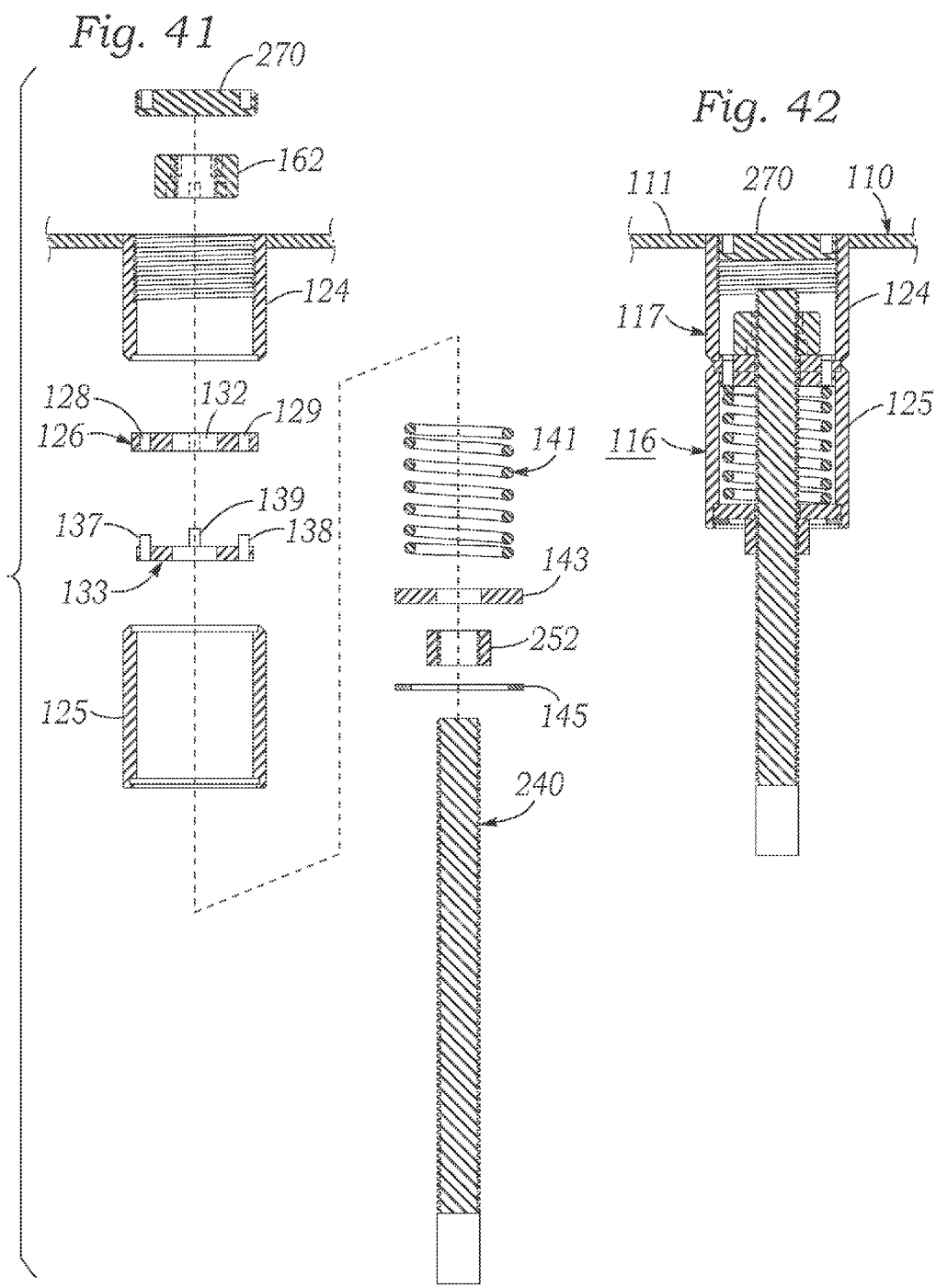

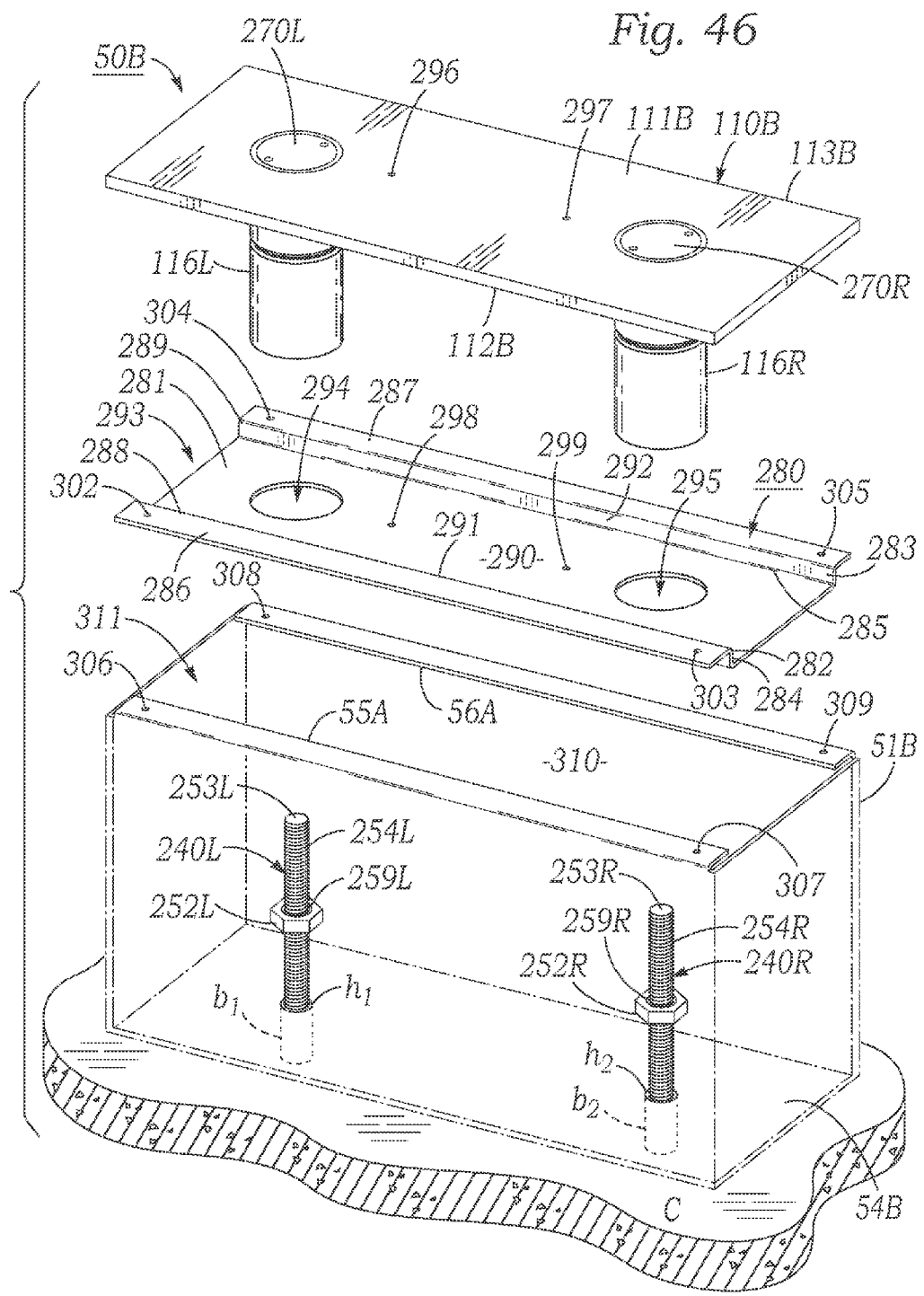

COPPER WIRE THEFT PROTECTION METHOD AND APPARATUS FOR WALL-MOUNTED PULL BOXES

BACKGROUND OF THE INVENTION

A. Field of the Invention

The present invention relates to electrical junction boxes which are known as pull boxes and used to enclose interconnections between electrical power mains cables and electrical power distribution cables connected to devices such as municipal and highway street lighting fixtures, traffic signals and the like. More particularly, the invention relates to a novel theft-dissuading security lid for wall-mounted wire pull boxes, and novel tools and methods for retrofitting existing wall-mounted pull boxes with the security lid.

B. Description of Background Art

Electrical junction boxes are widely used to connect electrical power input cables of street lights installed along streets and highways to electrical power mains. Such junction boxes, for reasons which will become apparent from the following discussion, are typically referred to as pull boxes. A first, ground-mounted type of pull box is typically installed in a shallow pit dug into the ground, and has generally the form of a rectangular ring-shaped concrete shell. The open bottom of the shell is fitted down into a pit which has been dug into the ground and has two or more conduits that protrude upwardly from the bottom of the pit. The conduits have protruding outwardly from open upper ends thereof insulated electrical power line cables which are strung through the bores of the conduits, and include a power source conduit that contains cables which are connected at distal ends thereof to a power pole or other source of electrical power, and pulled through the conduit, which is horizontally disposed under the ground. The pull box pit also has a second conduit which is disposed between the pit and a destination requiring electrical power, such as a street light or highway lighting fixture.

A second, wall-mounted type of pull box in common use consists essentially of an open-top, rectangular metal box which is inserted into a similarly shaped cavity or recess formed in a concrete highway or street barrier or sound wall.

Within the hollow interior space of a pull box shell, electrical interconnections or splices are made between copper wires of power mains cables and power distribution cables leading to a lighting fixture or other electrical power consuming device. Usually, the interconnections include high-current fuses. After interconnecting splices have been made between power mains cables and power distribution cables which extend out through the exit conduit to a street light or other electrical device, a cover lid is installed on the pull box.

The cover lid of a ground-mounted pull box typically consists of a concrete slab which is lowered into a recess in the upper end of the concrete shell of the pull box, and easily lifted off from the shell by inserting a screwdriver or pry bar into a slot in the lid. The cover lid of a wall-mounted pull box typically consists of a flat metal plate which is bolted to a pair of laterally opposed mounting flanges which extend from the upper edges of opposite vertical side panels of the pull box.

Pull boxes of the type described above are used extensively for such applications as providing electrical power to a row of light standards used to illuminate a street or highway. In such applications, electrical power from a power line main located near one of the light standards is supplied to a first light standard through electrical interconnections made between power cables entering the pull box through a first, power mains source conduit and supply cables to the light standard exiting the pull box through a second, feeder conduit disposed between the pull box and the first light standard.

In a typical power distribution arrangement for a row of street or highway light standards, a first pull box which provides power to a first light standard in a row or chain, also has protruding into the interior space at the end of a third conduit which contains electrical wires that are disposed through the third conduit which runs under the surface of the ground to a second pull box located near a second light standard in a row of light standards.

Electrical connections are also made in the first pull box between the power mains cables and the cables leading to the second pull box, thus providing electrical power from the mains to the second light fixture.

In this way, electrical power from a single power mains source is provided to a row of street lighting fixtures in a series of pull boxes containing interconnected electrical wires in an arrangement sometimes referred to as a "daisy chain."

Although the daisy chain power distribution arrangement of pull boxes described above is straight forward and efficient, problems have recently arisen when the arrangement is implemented with existing pull boxes, for the following reasons.

In recent years, the price of copper has risen sharply, from a cost of one dollar U.S. per pound in December 2008 to four dollars and fifty cents U.S. per pound in 2011. Because of the steep rise in the price of copper as a commodity, thieves have been motivated to engage in theft of copper wire which is then sold to scrap dealers.

One technique for stealing copper wire which has gained in popularity with thieves involves removing the lid of a pull box in a daisy-chain of pull boxes, removing the lid from an adjacent pull box in a daisy chain, freeing the ends of the wires in both pull boxes by cutting the wires, and pulling the freed lengths of wires out of one or the other of the pull boxes. There have been several well documented cases in the United States where thieves who made the initial cuts in daisy-chain power cables, apparently oblivious to the fact that cables carried electrical power, were incinerated for their efforts.

In response to problems including dangers to the public resulting from the loss of street or highway lighting because of theft of copper wire used to supply power to the lights, the present inventors disclosed in co-pending patent application Ser. No. 11/933,996 for Wire Theft Protection For Pull Boxes a security enclosure for ground-mounted pull boxes. The security enclosure disclosed in that application has various security measures which thwart access to wire cables contained within the enclosure, and has proved to be substantially effective in reducing theft of wire from pull boxes fitted with the security enclosures. The present invention was made in response to a need for a wire theft protection apparatus useable to protect against theft of copper wire from wall-mounted pull boxes.

OBJECTS OF THE INVENTION

An object of the present invention is to provide a method and apparatus for preventing unauthorized access to wall-mounted pull boxes used to enclose electrical interconnections between electrical power mains cables and power distribution cables connected to street lights, traffic signals and the like, to thus protect against theft of the copper wire cables.

Another object of the invention is to provide a wire theft protection method and apparatus which is useable to secure a new or previously installed wall-mounted pull box in a recess in a concrete wall.

Another object of the invention is to provide a modification kit and method of using the kit to upgrade existing wall-mounted pull boxes, the upgrade securing the pull box against removal from a wall, and securing the interior of the pull box against unauthorized access, thus thwarting theft of copper wire cables which are interconnected within the box.

Another object of the invention is to provide a novel locking collar nut mechanism, security lid, and tools for securing the security lid onto a wall-mounted pull box to thereby thwart unauthorized access to copper wires within the pull box.

Another object of the invention is to provide a novel drilling fixture, tools and method for securing a wall-mounted pull box against removal or unauthorized access to the interior of the pull box.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends a novel wire theft protection method and apparatus for thwarting theft of copper wire cables which are interconnected within and therefore accessible from the interior of electrical junction boxes of the type that are installed in a concrete wall and commonly referred to as wall-mounted pull boxes. According to the invention, a kit is provided for upgrading existing wall-mounted pull boxes which are installed in a wall near street or highway light standards and traffic lights and other such electrical devices located on public thoroughfares and owned and operated by a city, state or other governmental unit. The invention includes a novel security lid, keyed collar nut and tools for torqueing the collar nut, and a novel drilling fixture and tools and method for installing and securing a new pull box in a wall, or alternatively to retrofit a previously installed pull box to thwart theft of copper wire from a pull box.

A method for retro-fitting the novel wire protection security lid according to the present invention includes the following steps:

First, electrical power supplied to an existing wall-mounted pull box is shut off.

Second, the existing cover lid of the pull box is un-bolted and removed.

Third, a rectangular base plate of a novel drilling guide fixture is bolted onto the upper surface of pull box in place of the cover lid.

Fourth, an elongated concrete drill bit is inserted into a first one of a pair of laterally spaced apart drill guide tubes of the drilling guide fixture until the point of the drill bit contacts the bottom upper surface of the bottom wall panel of the pull box, and the upper flat end of the drill bit shank extending above the upper surface of the drill guide fixture struck a blow with a hammer to thus form a first indentation in the upper surface of the bottom wall panel, the indentation locating the center point of a first hole to be formed in the bottom wall panel.

Fifth, the drill bit is withdrawn upwardly to remove it from the first drilling guide tube, inserted into the second drilling guide tube, and struck to form a second hole-center location indentation in the bottom wall panel of the pull box.

Sixth, the drilling guide fixture is unbolted from the pull box and removed, and a hole saw used to cut two circular metal slugs centered on the two indentations from the bottom wall panel of the pull box, which slugs are then removed from the pull box.

Seventh, the drilling guide fixture is once again bolted to the pull box.

Eighth, the concrete drill bit is inserted into a first one of the drilling guide tubes, clamped in the chuck of a power drill, and used to drill a first concrete stud anchor hole in concrete below the first slug hole in the bottom wall panel of the pull box.

Ninth, the concrete drill bit is withdrawn from the first drilling guide tube, inserted into the second drilling guide tube, and rotated by the power drill to form a second concrete stud anchor hole laterally spaced apart from the first concrete stud anchor hole in concrete below the second slug hole in the bottom wall panel of the pull box.

Tenth, the drilling guide fixture is unbolted and removed from the pull box.

Eleventh, the exterior surfaces of a pair of internally threaded cylindrical concrete bolt or stud anchors are coated with a liquid adhesive such as epoxy, the stud anchors are inserted into the pair of laterally spaced apart holes drilled into the concrete, and an expansion slug within the bore of each bolt anchor is driven downwards by the impact of an elongated, hammer-driven rod to thus expand adhesive-coated split wing sections at the lower ends of the bolt anchors into compressive contact with the walls of the concrete holes.

Twelfth, sufficient time is allowed for the liquid epoxy to solidify and thereby secure the bolt anchors in the concrete holes.

Thirteenth, a pair of parallel, laterally spaced apart vertical elongated straight threaded studs are inserted downwardly into and threadingly tightened within the two internally threaded concrete stud anchors.

Fourteenth, a separate hex nut is threaded onto the threaded shank of each of the two upwardly protruding studs, to a pre-determined distance below the upper transverse ends of the studs.

Fifteenth, a security lid which has generally the shape of a thick rectangular metal plate that has protruding perpendicularly downwards from its lower surface a pair of laterally spaced apart tubular locking assemblies is positioned over the upstanding ends of the threaded studs, and moved downwards to receive the upper ends of each of the two studs through the center of an annular spring retainer end plate at the lower end of each of the tubes, to thus seat the lower surfaces of the annular spring retainer end plates on the upper surfaces of the hex nuts.

Sixteenth, a novel cylindrical compression key tool is slipped coaxially into an upper entrance opening of a bore through a first one of the tubular locking assemblies of the security lid, and a pair of longitudinally disposed drive pins which protrude downward from diametrically opposed sides of the lower annular surface of the compression key tool butted down against a pair of axially aligned locking pins which protrude upwardly from the upper circular surface of a floating locking pin plate through corresponding holes in a fixed perforated locking pin guide plate fixed longitudinally midway in the tube assembly, the floating plate and pins being urged upwardly by a strong compression spring compressed between the upper surface of the spring retainer plate at the bottom of the tube assembly, and the lower surface of the floating plate.

Seventeenth, an externally threaded compression ring is threaded into an internally threaded lower part of the bore in the upper part of the tubular locking assembly, and threadably tightened down by a novel turnstile-type spanner wrench tool which has a cylindrical body of smaller diameter than the bore of the tubular locking assembly, and a pair of longitudinally downwardly disposed drive pins which engage similarly located drive bores in the upper annular surface of the compression ring to thus cause the compression ring to press down against the upper surface of the lower cylindrical compression key tool and thereby depress the upwardly protruding locking pins of the floating plate flush with the upper surface of the fixed plate.

Eighteenth, a novel circular collar locking nut with six blind locking pin bores that are spaced circumferentially apart at regular intervals and extend axially upwards into the nut from its lower annular surface, and two diametrically opposed blind drive bores that extend downwards into the nut from its upper annular surface, is threaded onto the upwardly extending upper end of an anchor stud that protrudes through central coaxially aligned bores through the spring retainer plate, floating locking pin plate and fixed locking pin plate.

Nineteenth, a smaller diameter tubular turnstile type spanner wrench having a pair of diametrically opposed drive pins that protrude perpendicularly downwards from its lower annular surface is inserted downwardly into the bore of the larger spanner wrench tube to thus insert drive pins of the smaller diameter spanner wrench into the drive bores in the upper surface of the circular collar nut, the smaller diameter spanner wrench then being twisted about its longitudinal axis to thus torque the collar nut threadably downwards until the lower annular surface of the collar nut seats on the upper face of the fixed locking pin guide plate.

Twentieth, the larger spanner wrench is rotated clockwise to thus loosen the compression ring and compression key, thus enabling the locking pins of the floating locking pin guide plate to be urged upwards through holes in the perforated fixed guide plate in response to upward pressure exerted by the compression spring.

Twenty-first, the smaller diameter spanner wrench is twisted counterclockwise to threadingly loosen and turn the collar nut sufficiently for a pair of locking pins protruding upwardly from the floating locking pin the locking plate through perforations in the fixed perforated guide plate become axially aligned with and spring upward into a pair of diametrically opposed holes in the lower annular face of the collar locking nut, thus locking the collar nut against rotation.

With the keyed locking collar nut threadably tightened on the threaded anchor stud against the upper surface of the fixed perforated guide plate of the tubular locking assembly of the security lid, the lower, outer surface of the spring retainer plate at the bottom of the tubular locking assembly is pressed against the upper surface of the hex nut which was initially threaded onto a threaded stud to a predetermined distance below the upper end face of the stud. That distance is selected to position the upper surface of the security lid plate flush with the upper surface of the wall-mounted pull box, and the upper end of the stud a short distance below the upper surface of the security lid plate. The distance is sufficient to receive an externally threaded cap which is later threaded into the upper end of a threaded bore of the locking tube assembly.

Twenty-second, steps sixteen through twenty-one are repeated to fasten the second tubular locking assembly of the security lid to the second anchor stud.

Twenty-third, a separate threaded cap is threadably tightened into the upper end of each of the two tubular locking assemblies.

Twenty-fourth, the original weather cover that was removed from the pull box is re-fastened by bolts to the box above the security lid.

Notably, not all of the pull boxes in a daisy chain sequence of pull boxes need to be retrofitted using the novel copper wire theft protection method and apparatus according to the present invention. Typically, only every other pull box in a daisy chain needs to be retrofitted. Moreover, since the retrofitting method includes re-installation of the original removable weather cover, which conceals the security lid, thieves would have to go to the trouble of removing the original weather cover to ascertain whether or not a particular pull box is protected by a security system according to the present invention.

BRIEF DESCRIPTION OF THE DRAWINGS

FIG. 1 is a perspective view of a wall-mounted pull box of the type the anti-theft enclosure of the present invention is intended to be used with.

FIG. 7 is an upper plan view of drill fixture component of a wall pull box wire theft protection method and apparatus according to the present invention.

FIG. 8 is a front elevation view of the fixture of FIG. 7.

FIG. 9 is an end elevation view of the fixture of FIG. 7.

FIG. 15A is a fragmentary view of the security lid of FIG. 14 showing a locking tube assembly thereof.

FIG. 15B is a longitudinal medial sectional view of the locking tube assembly of FIG. 15A.

FIG. 15C is a longitudinal medial sectional view of the locking tube assembly of the security lid of FIG. 11 shown FIG. 15A, showing internal components of the locking tube assembly.

FIG. 16 is a plan view of a fixed locking pin guide plate of the locking tube assembly of FIGS. 15A and 15C.

FIG. 17 is a side elevation view of the guide plate of FIG. 16.

FIG. 22 is a lower plan view of a novel locking collar nut according to the present invention.

FIG. 23 is a side elevation view of the locking collar nut of FIG. 22.

FIG. 24 is a first longitudinal medial sectional view of the locking collar nut of FIG. 22, taken in the direction indicated by the line 24-24.

FIG. 25 is an upper plan view of the locking collar nut of FIG. 22.

FIG. 26 is a second longitudinal medial sectional view of the locking collar nut of FIG. 22, taken in the direction indicated by the line 26-26.

FIG. 27 is a front perspective view of an assembly tool kit according to the present invention.

FIG. 28 is a lower end elevation view of the tool kit of FIG. 27.

FIG. 29 is a view similar to that of FIG. 28, but showing a keeper pin of the tool kit removed.

FIG. 30 is an exploded lower perspective view of the tool kit of FIG. 22.

FIG. 32A is an exploded lower perspective view of the tool kit of FIG. 27, showing internal components of the locking tube assembly of FIG. 15C.

FIG. 32B is an upper perspective view of the tool kit and locking tube components parts shown in FIG. 32A.

FIG. 34 is a perspective view showing a second step in using the drill fixture shown in FIGS. 7-10 and 33.

FIG. 35 is a perspective view showing how two stud anchor holes are drilled into concrete below the lower surface of the bottom wall of the pull box.

FIG. 36 is a vertical medial sectional view showing formation of one of a pair of bore holes in concrete for bolt anchors and a pair of threaded anchor studs, as shown in FIG. 39E.

FIG. 37A is a view similar to that of FIG. 36, showing how split wings of a bolt anchor are expanded to grip the walls of the concrete bore holes.

FIG. 37B is an expanded view of the bolt anchor of FIG. 37A.

FIG. 38 is a view similar to FIG. 37, showing a fully expanded split wing.

FIG. 39A is an exploded lower perspective view of a pull box bolt anchors, and anchor studs.

FIG. 39B is an upper perspective view of the components shown in FIG. 39A.

FIG. 39C is a perspective view of a bolt anchor.

FIG. 39D is a lower perspective view of the pull box and anchor studs of FIG. 39A.

FIG. 40A is an upper plan view of a security lid lockingly attached to a pull box according to the present invention.

FIG. 40B is a vertical medial sectional view of the structure of FIG. 39D.

FIG. 41 is a fragmentary exploded view of one of the two locking tube and anchor stud assemblies of FIG. 40.

FIG. 42 is an assembled view of a locking tube assembly and anchor stud of the pull box and security lid of FIG. 40A.

FIG. 46 is an exploded perspective view of another modification of a copper coil theft protection method and apparatus according to the present invention.

DESCRIPTION OF THE PREFERRED EMBODIMENTS

Figure 1:
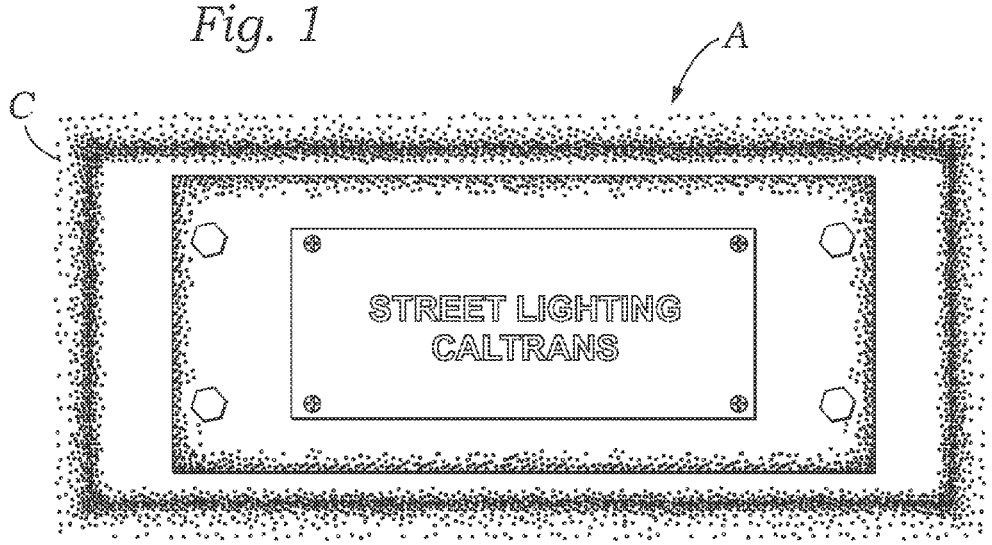
Figure 2:
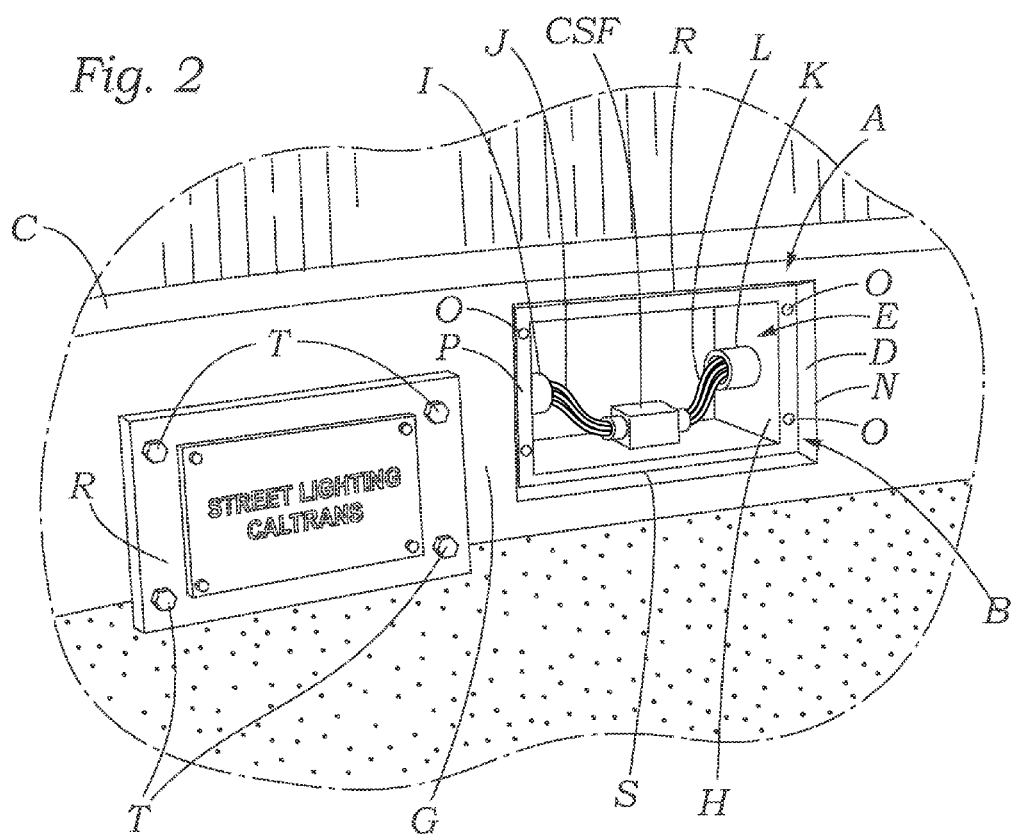
FIG. 2 is a view similar to that of FIG. 1, showing a cover lid of the pull box removed.

FIG. 1 illustrates a typical prior art or existing installation of a wall-mounted pull box A installed in a recess B in a concrete wall C. As shown in FIGS. 1 and 2, pull box A includes a uniform transverse cross-section, laterally elongated rectangular shell D which has generally the shape of a box that has at an upper or outer end thereof a rectangular opening E. Shell D of pull box A has a hollow rectangular block-shaped interior space F. As shown in FIG. 2, interior space F of pull box A has protruding through left and right side walls G and H thereof the open ends of two or more electrical conduits from which electric power cables protrude. Thus, for example, FIG. 2 shows a first electrical conduit I from which protrude power mains cables J which are connected at distal ends thereof to a power pole or other source of electrical power.

Pull box shell D also has protruding into interior space F thereof, a second conduit K from which protrudes electrical power distribution cables L that are connected at distal ends thereof to a device which requires electrical power such as a street or highway light standard.

Individual pairs of copper wire conductors of input power mains cable J and power distribution cables L are electrically interconnected within interior space F of pull box A by connector splices and fuses CSF.

As shown in FIGS. 1 and 2, shell D of pull box A has extending laterally outwards from upper edges of left and right side walls G and H thereof a pair of left and right thin longitudinally elongated, rectangular cover mounting flanges M and N. Each left and right cover mounting flanges M and N has through its thickness dimension a pair of longitudinally spaced apart threaded bolt holes O and P.

Pull box A also typically has a pair of thin laterally elongated lip flanges R and S which are formed by upper edges of front and rear wall panels T and U of the pull box, the lip flanges being bent horizontally inwardly towards a laterally disposed center line of the box.

As shown in FIGS. 1 and 2, pull box A is enclosed by a removable rectangular cover plate Q. Cover plate Q is attached to shell D of pull box A by bolts T threadably tightened into flange bolt holes O and P, and readily removable by thieves to access the interior apace F of the pull box to facilitate theft of copper wire cables extending into the pull box.

FIGS. 3-6 illustrate the shell of a pull box component of a copper wire theft protection method and apparatus for wall-mounted pull boxes according to the present invention.

FIGS. 7-10 illustrate a novel drill fixture for use in the method and apparatus according to the present invention.

FIGS. 11-26 illustrate a novel security lid according to the present invention which is installable on an existing pull boxes of the type shown in FIGS. 1 and 2, or a new theft protection pull box of the type shown in FIGS. 3-6.

FIGS. 27-32B illustrate a novel tool kit used to install a novel security lid onto a wall-mounted pull box of the type shown in FIG. 1-2 or 3-6.

FIGS. 33-38 illustrate beginning steps of a method according to the present invention for retrofitting an existing wall-mounted pull box of the type shown in FIGS. 1-2 to protect against wire theft, or alternatively to install a new theft-protecting pull box of the type shown in FIGS. 3-6, in which anchor studs are secured to the base of a recess in a wall in which a pull box is mounted.

FIGS. 39A-40B and 41-45 show details of anchor tube assemblies and anchor studs according to the present invention, and show a method of using the tool kit of FIGS. 27-38 to lock a security lid shown in FIGS. 11-26 to anchor studs of wall-mounted pull boxes.

Figures 40C, 40D:
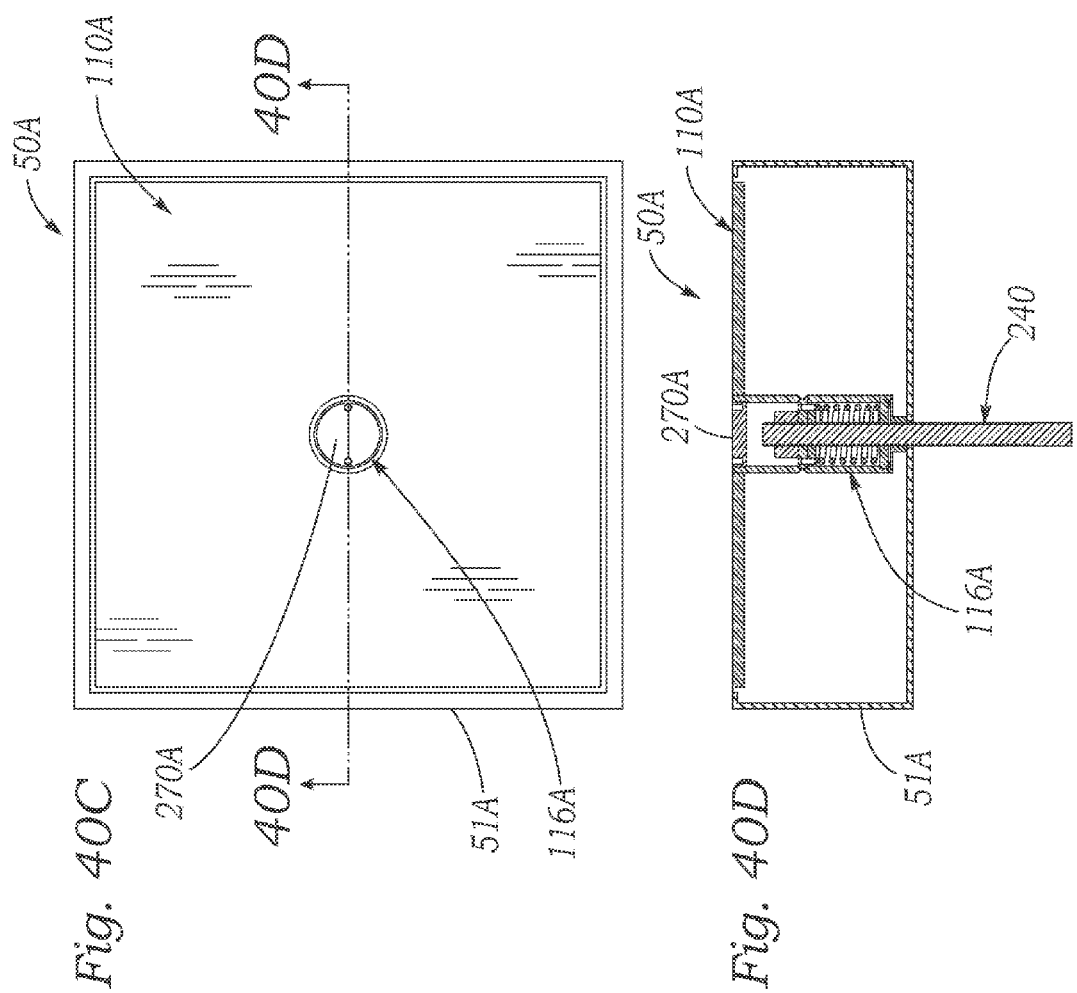
FIG. 40C is an upper plan view of a modification of the security lid of the present invention shown in FIGS. 11-26, which has a square plan view shown for use with square pull boxes and which has a single locking tube assembly.
FIG. 40D is a vertical medical sectional view of the security lid of FIG. 40C, showing that lid fastened to a square plan-view pull box.

FIGS. 40C and 40D illustrate a modification of a security lid according to the present invention.

FIG. 46 illustrates a modification of the method and apparatus of the present invention.

Referring now to FIGS. 3-6, it may be seen that a copper wire theft protection apparatus 50 for wall-mounted pull boxes according to the present invention includes for new installations a pull box 51 of conventional design. Apparatus 50 is also useable to retrofit previously installed pull boxes such as pull box A shown in FIGS. 1 and 2 and described above.

As shown in FIGS. 3-6, pull box 51 includes a uniform transverse cross-section, laterally elongated rectangularly shaped metal. shell 52 which has a laterally elongated rectangularly-shaped open upper end 53. Shell 52 is preferably fabricated from heavy gauge sheet steel stock.

Figure 3:
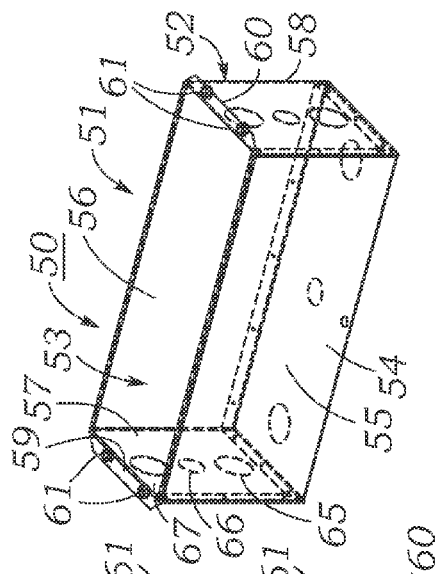
FIG. 3 is a perspective view of a pull box of the type shown in FIGS. 1 and 2.
Figure 4:
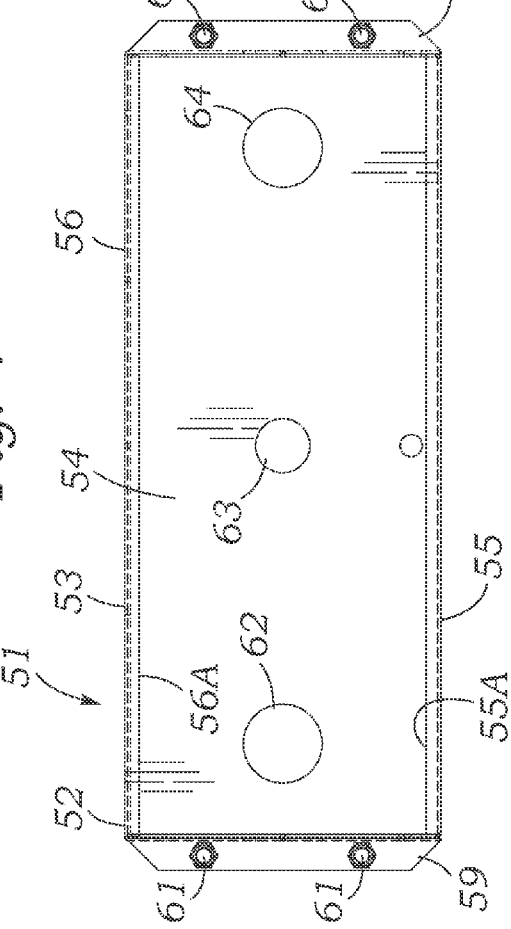
FIG. 4 is an upper plan view of the pull box of FIG. 3.
Figure 5:
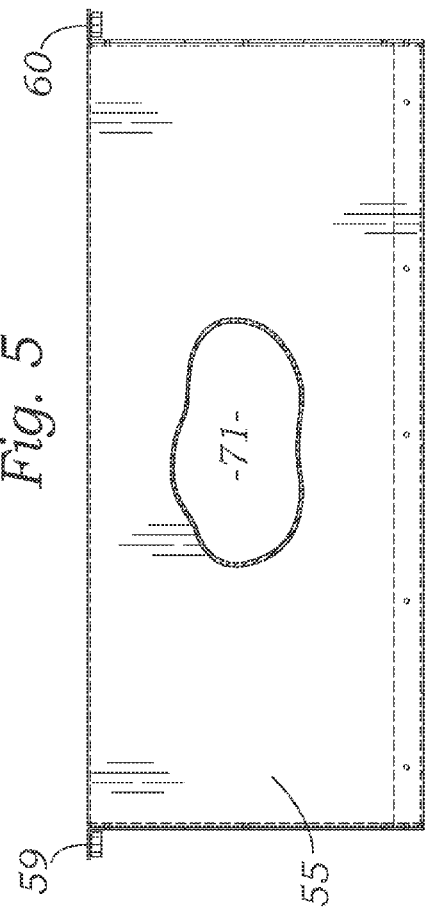
FIG. 5 is a front elevation view of the pull box of FIG. 3.

As shown in FIGS. 3-6, shell 52 of pull box 51 has a flat laterally elongated rectangularly-shaped bottom wall panel 54 and front and rear wall panels 55, 56 which extend perpendicularly upwards from front and rear edges, respectively, of the bottom wall panel. Shell 52 of pull box 51 also has left and right rectangularly-shaped side wall panels 57, 58 which extend perpendicularly upwards from left and right edges respectively of the bottom wall panel 54. As shown in FIGS. 4 and 5, left and right side wall panels 57, 58 of pull box shell 51 have extending horizontally outwards from upper edges thereof thin, longitudinally elongated, rectangularly-shaped fastener flanges 59, 60, respectively. Each left and right fastener flanges 59, 60 has disposed through its thickness dimension a pair of longitudinally spaced apart, internally threaded inserts 61.

Figure 6:
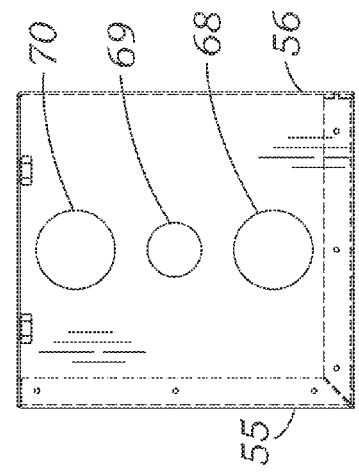
FIG. 6 is an end elevation view of the pull box of FIG. 3.

Referring to FIGS. 3, 4 and 6, it may be seen that the panel walls of shell 52 of pull box 51 have through their thickness dimension several partly severed circular cut-outs or knockouts which may be readily knocked out by a workman at desired locations to receive electric conduits. Thus, as shown in the figures, bottom wall panel 54 of pull box shell 52 has partially severed through its thickness dimension a row of three laterally spaced circular disk-shaped knockouts 62, 63, 64. As shown in FIGS. 3 and 6, left side wall panel B has through its thickness dimension a row of three vertically spaced apart circular disk-shaped knockouts 65, 66, 67. Similarly, right side wall panel 58 has through its thickness dimension a row of three vertically spaced apart circular disk-shaped knockouts 68, 69, 70.

Although any of the nine knockouts 62-70 of pull box shall 53 shown in FIGS. 3-6 may be used to receive copper wire cables into the hollow interior space 71 of pull box shell 52, in typical installations of a wall-mounted pull boxes of the type shown in FIGS. 1 and 2, knockouts in side wall panels such as knockouts 65-70 are generally used.

FIGS. 7-10, illustrate a novel drill fixture 72 for use with the method and apparatus according to the present invention.

Figure 10:
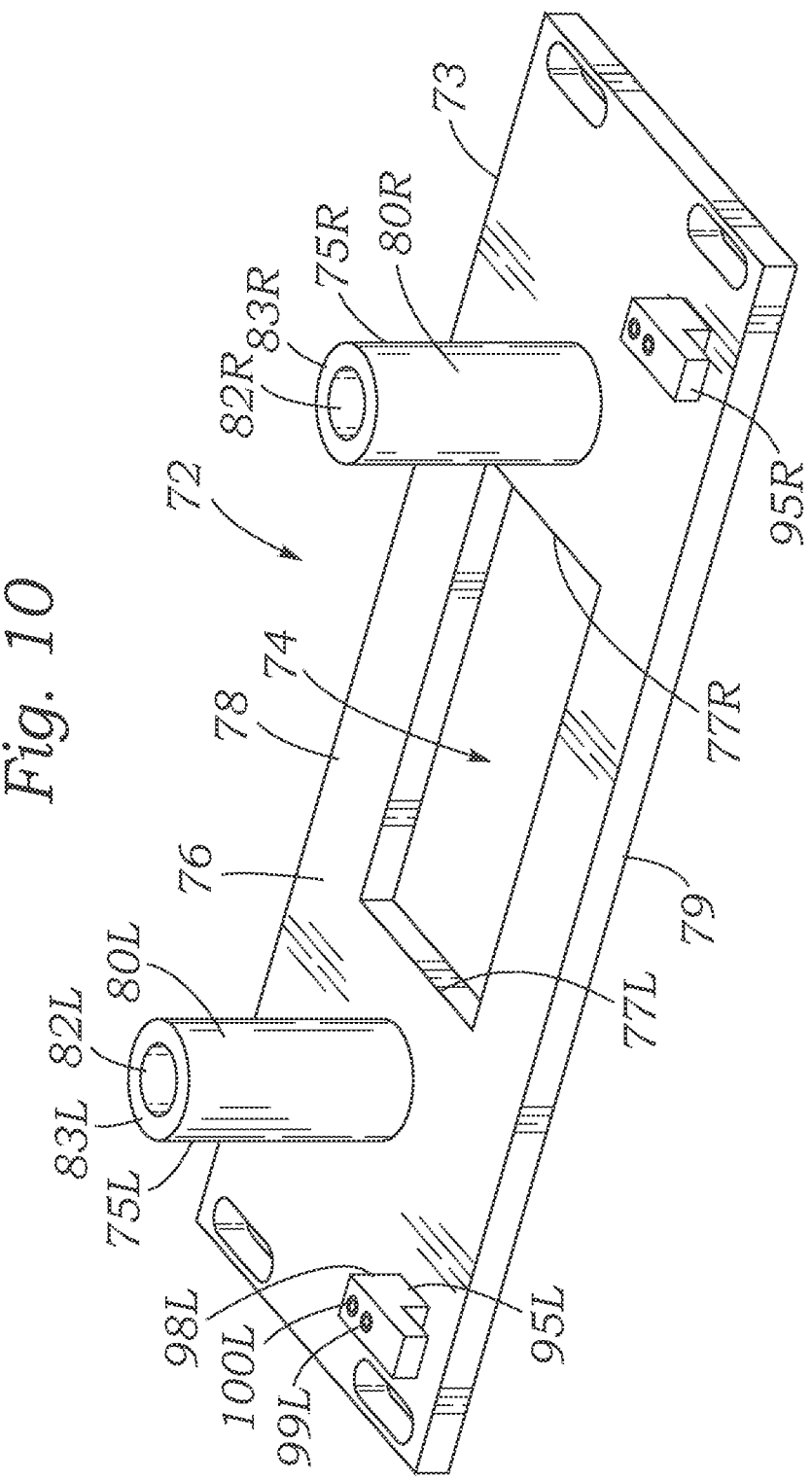
FIG. 10 is a lower perspective view of the fixture of FIG. 7.
Figure 11:
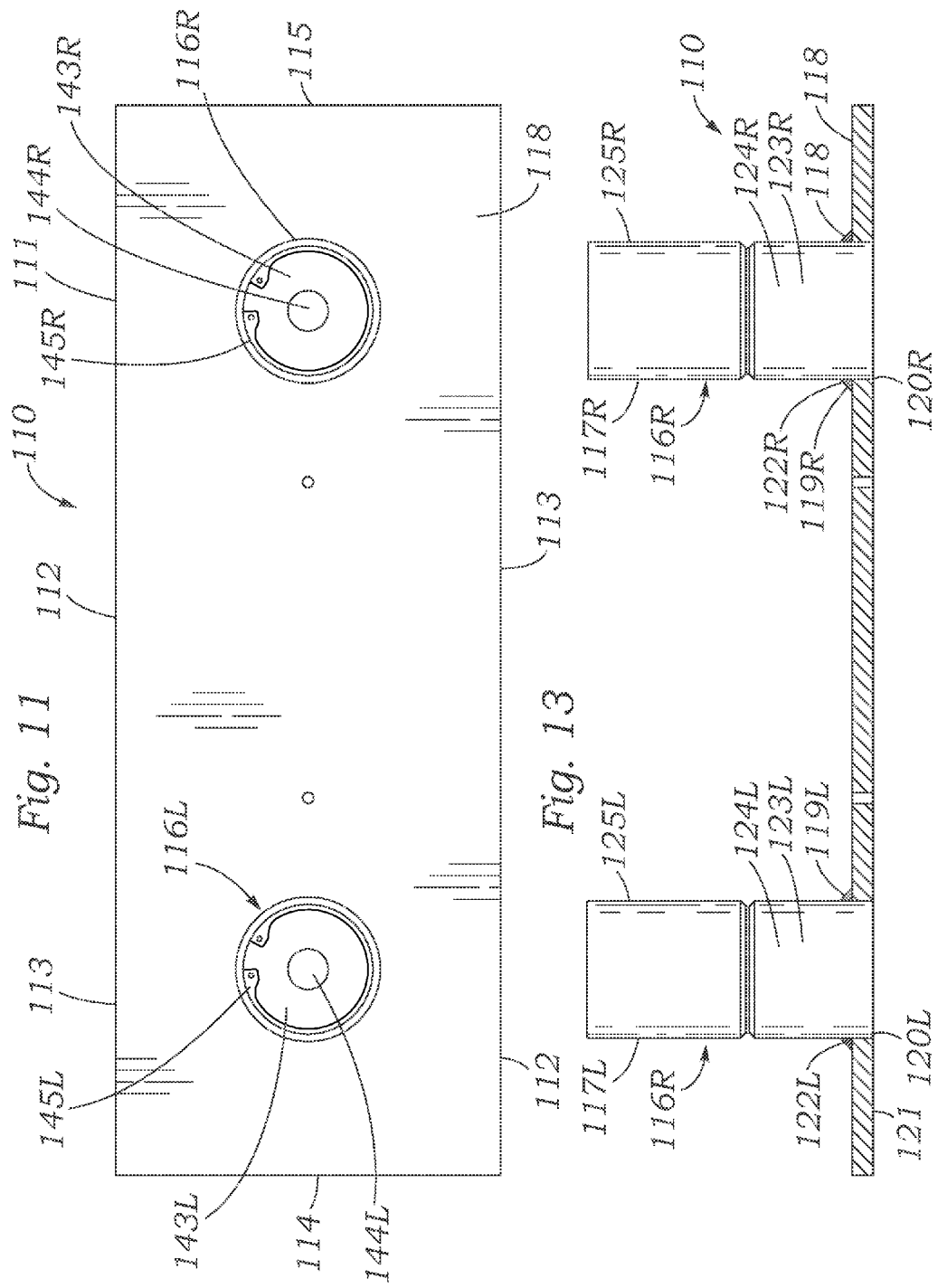
FIG. 11 is a lower plan view of a security lid component of the wire theft protector method and apparatus according to the present invention.

As shown in FIGS. 7-10, drill fixture 72 includes a relatively thick, laterally elongated rectangularly-shaped metal mounting plate 73. As shown in FIGS. 7 and 10, mounting plate 73 of drill fixture 72 has through its thickness dimension a relatively large, laterally elongated rectangularly-shaped access hole 74 which is centrally located with respect to the front and side edges of the mounting plate.

As shown in FIGS. 7-10, drill fixture 72 includes a pair of parallel, vertically disposed left and right laterally spaced apart drill guide tubes 75L, 75R which extend perpendicularly downwards from the lower surface 76 of fixture mounting plate 73. The drill guide tubes 75L, 75R are spaced equidistant laterally outwards from left and right side edges 77L, 77R of the central rectangular access hole 74 through mounting plate 73 of the fixture. Also, drill guide tubes 75L, 75R are located on a laterally disposed center line of mounting plate 73, equidistant between front and rear laterally disposed edges 78, 79 of the mounting plate.

Referring still to FIGS. 7-10, it may be seen that each drill tube 75L, 75R has generally the shape of a relatively long, longitudinally elongated, thick-walled circular cross-section cylindrical body 80 which has at the upper end thereof a relatively short, reduced diameter axially disposed coaxial externally threaded fastener neck section 81. As shown in FIGS. 8-10, cylindrical body 80 of each drill guide tube 75 has disposed through its length a central coaxial smooth drill bit guide bore 82 which extends through lower transverse end face 83 and upper transverse end face 84 of the cylindrical body 80.

Referring to FIGS. 8 and 9, it may be seen that upper neck section 81L, 81R of each drill bit guide tube 75L, 75R extends upwards from upper surface 85 of fixture mounting plate 73 through a circular bore 86L, 86R through the mounting plate. In a preferred construction of drill fixture 72, each drill bit guide tube 75L, 75R is fastened to mounting plate 73 of the fixture by a hex nut 87L, 87R, threaded onto the externally threaded surface of neck section 81L, 81R of each guide tube, and threadably tightened down against the upper surface 85 of the mounting plate.

Referring to FIGS. 7 and 10, it may be seen that mounting plate 73 of drill fixture 72 has through its thickness dimension perforations in the form of elongated slots for receiving mounting bolts which are used to temporarily fasten the fixture to the cover flanges of a pull box shell. Thus, as shown in FIG. 7, mounting plate 73 of drill fixture 72 has located a short distance inwards of left side edge 88 of the mounting plate front and rear fore-and-aft elongated and aligned left-side mounting slots 89, 90. Mounting plate 73 also has located a short distance inwards of right side edge 91 thereof front and rear fore-and-aft elongated and aligned right-side mounting slots 92, 93.

Referring to FIGS. 7-10, it may be seen that drill fixture 72 also includes a pair of locating clamps which are used to locate the fixture at a precisely determinable fore-and-aft position relative to a pull box shell which the fixture is temporarily attached to. Thus, as shown in FIGS. 7-10, fixture 72 has attached to lower surface 76 of mounting plate 73 thereof a pair of left and right laterally spaced apart locating clamps 95L, 95R which are located near a front edge 78 or rear edge 79 of the mounting plate. Each clamp 95 includes a rectangular support block 98 which is fastened to the lower surface 76 of mounting plate 73 by a pair of fore-and-aft spaced apart and aligned outer and inner mounting screws 99, 100 inserted through vertical bores 101, 102 through the block and threadably tightened into bores 103, 104 which extend into the mounting plate from its lower surface.

Each locating clamp 95L, 95R also includes a fore-and-aft oriented, horizontally disposed clamping screw 105 which is threadably received through a fore-and-aft disposed horizontal bore 106 through mounting clamp block 98. As shown in FIG. 9, the shank 107 of clamping screw 105 extends forward of front surface 108 of clamp support block 98, and forms between the shank 107 of the clamping screw and lower surface 94 of mounting plate a throat 109 to engage an inwardly turned, laterally disposed front or rear lip flange 55A, 56A which extends inwardly from the upper edge of the front and rear wall panels 55, 56, respectively, of a pull box 51, as shown in FIG. 4.

A method of using drill fixture 72 according to the present invention to secure wall-mounted pull boxes against theft of copper wire is described below, following descriptions of a novel locking security lid and novel tools for attaching the security lid to a pull box.

Referring now to FIGS. 11-15B, it may be seen that a novel locking security lid 110 according to the present invention includes a laterally elongated, rectangularly-shaped flat base plate 111 which is preferably made of heavy gauge steel. As shown in the figures, base plate 111 of security lid 110 has straight and parallel, laterally disposed front and rear edges 112, 113, and straight and parallel left and right side edges 114, 115, which are perpendicular to the front and rear edges. As is also shown in FIGS. 11-15B, locking security lid 110 includes a pair of left and right tubular locking assemblies 116L, 116R that have tubular housings 117L, 117R which extend perpendicularly downwards from the lower surface 118 of base plate 111.

The housing 117L, 117R of locking tube assemblies 116L, 116R, have generally the shape of right-circular cylinders which are centered on a laterally disposed center line of base plate 111, and are located equal distances inward from left and right side edges 114, 115, respectively, of the base plate.

Figure 13:
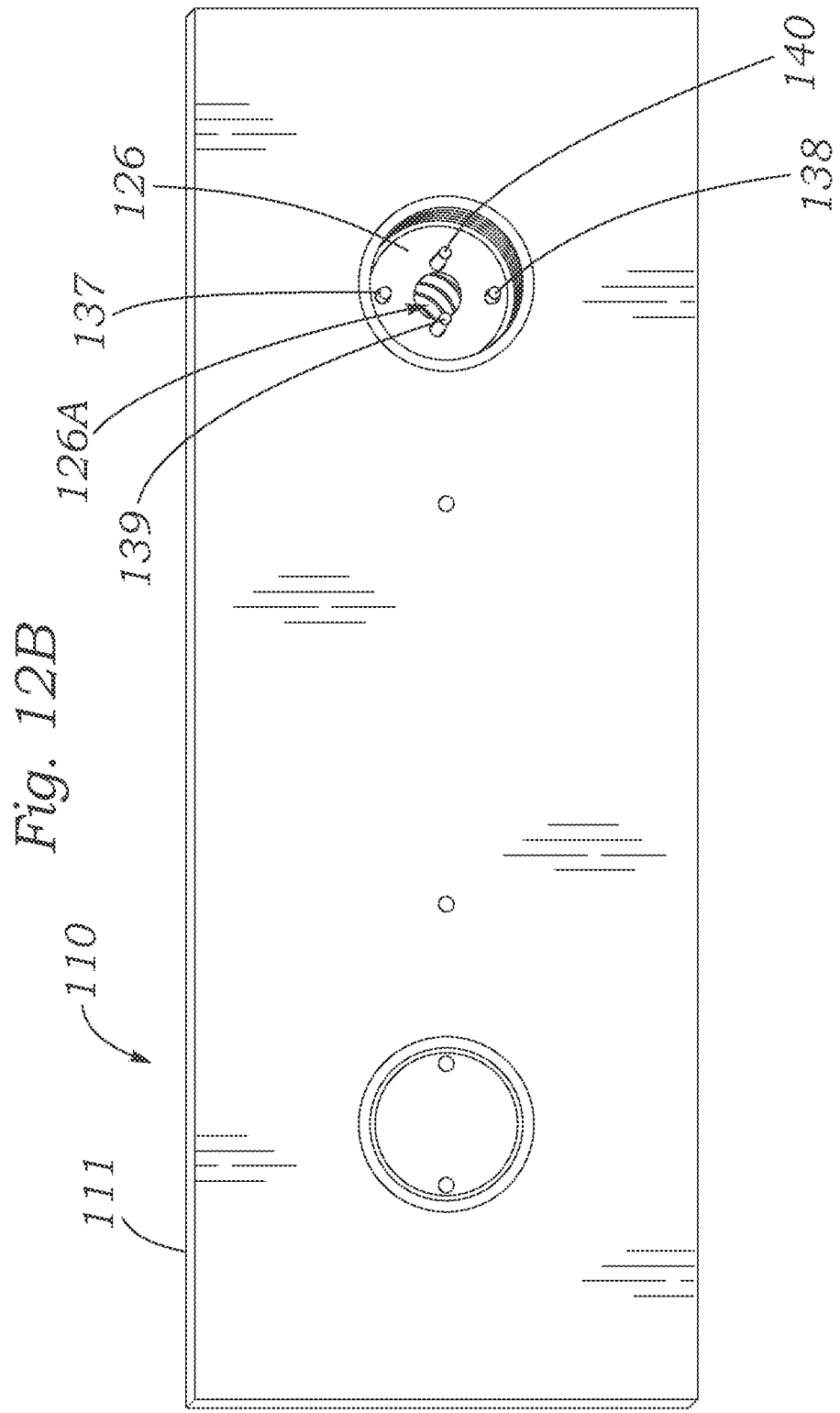
FIG. 13 is a partly sectional side elevation view of the security lid of FIG. 11.
Figure 14:
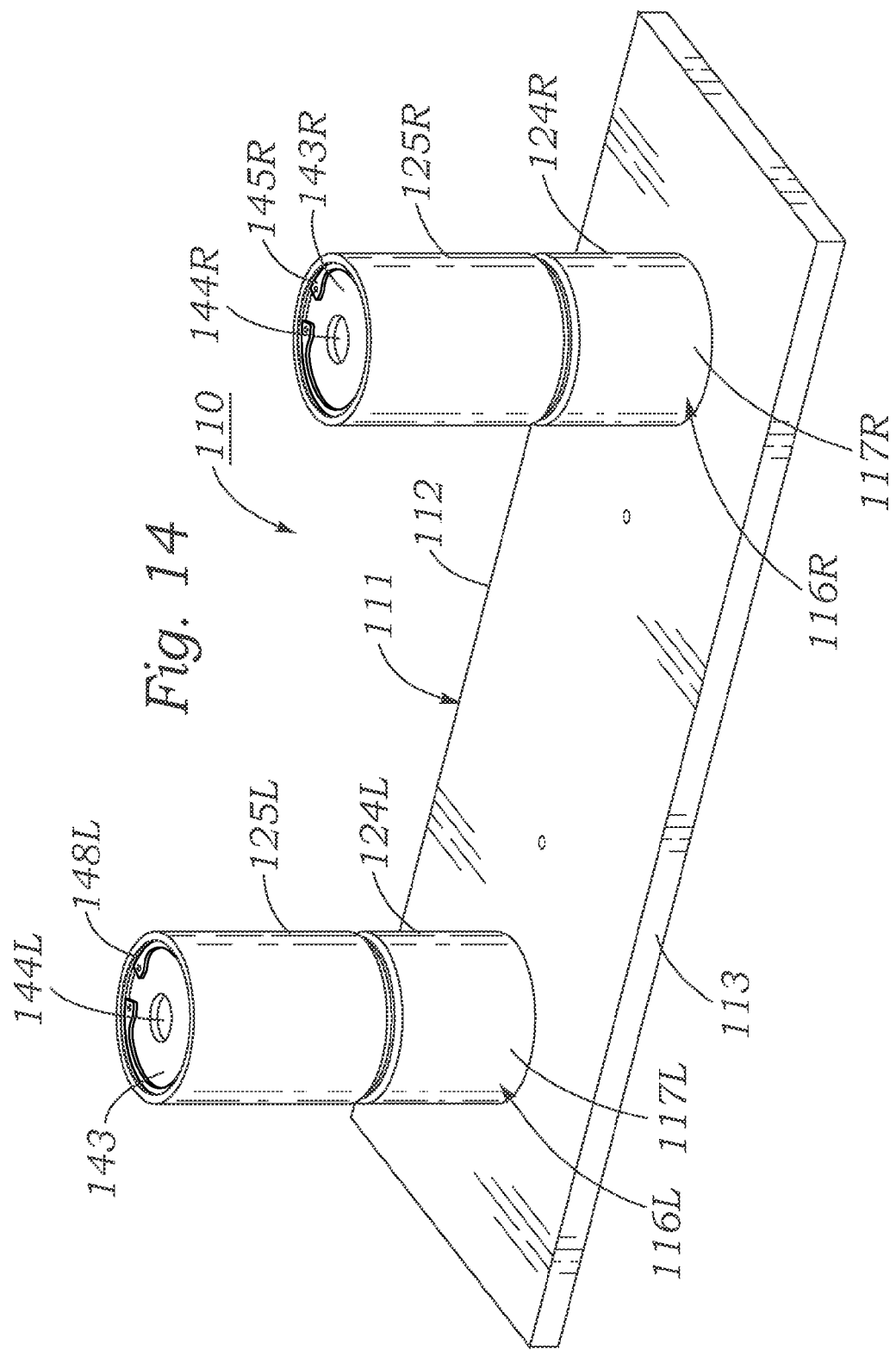
FIG. 14 is a lower perspective view of the security lid of FIG. 11.

As shown in FIG. 13, the left and right tubular housings 117L, 117R locking assemblies 116L, 116R are received in circular bores 119L, 119R through base plate 111 with the upper annular surfaces 120L, 120R of the tubular housings flush with upper surface 121 of the base plate. Preferably, as shown in FIG. 14, tubular housings 117L, 117R are fastened to base plate 111 by circular ring-shaped fillet welds 122L, 122R which are fused to lower surface 118 of the base plate and outer cylindrical wall surfaces 123L, 123R of the tubular housings.

Referring to FIGS. 15A-21, it may be seen that the tubular housing 117 of each tubular locking assembly 116 includes an upper hollow cylindrically shaped section 124 and an axially aligned lower hollow cylindrically shaped section 125.

As shown in FIGS. 15A-21, each tubular locking assembly 116 includes a fixed locking pin guide plate 126 that consists of a perforated circular disk which is fixed coaxially within a circular bore 127 disposed longitudinally through upper and lower cylindrically-shaped sections 124 and 125 of housing 117 of the locking assembly. Fixed locking pin guide plate 126 (see FIGS. 16, 17) is disposed transversely to the longitudinal axis of housing 117, and, located at the junction between upper and lower tubular sections 124, 125 of housing 117, and has through its thickness dimension a central circular bore 126A.

As shown in FIGS. 16 and 17, fixed locking pin guide plate 126 of tubular locking assembly 116 also has through its thickness dimension a first pair of diametrically opposed outer circular perforations 128, 129 which are located equidistant from the center of the guide plate, at locations close to the outer circumferential edge 130 of the guide plate. Fixed guide plate 126 also has through its thickness dimension a second pair of diametrically opposed inner circular perforations 131, 132 which are located equidistant from the center of the guide plate. Perforations 131, 132 are located on a diameter of fixed guide plate 126 which is oriented at ninety degrees to a line joining outer perforations 128-129, at locations closer to the center of the guide plate.

As shown in FIGS. 15C, 18 and 19, 32A, 32B, 41 and 42, tubular locking assembly 116 includes an annular ring-shaped floating locking pin plate 133 which is longitudinally slidably located within a lower part 142 of bore 127 through locking tube assembly housing 117 located in lower section 125 below fixed locking pin guide plate 126. Floating locking pin plate 133 has a thin, uniform thickness, annular ring-shaped base plate 135 that has through its thickness dimension a central circular bore 136.

Figure 19:
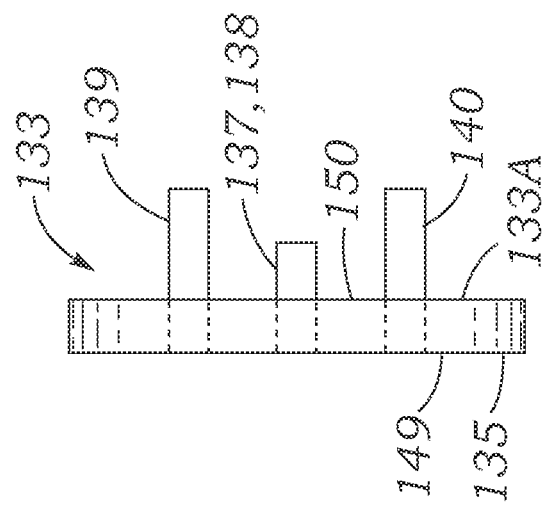
FIG. 19 is a side elevation view of the floating locking pin plate of FIG. 18.
Figure 18:
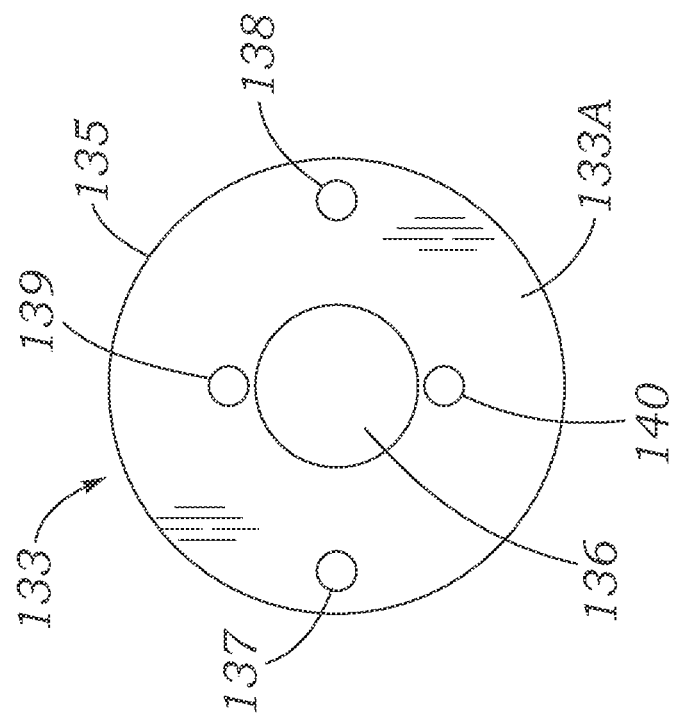
FIG. 18 is an upper plan view of a floating locking pin plate of the tube assembly of FIGS. 15A and 15C.
Figure 21:
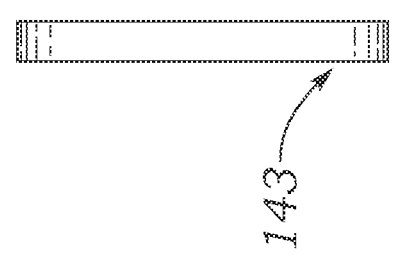
FIG. 21 is a side elevation view of the spring retainer plate of FIGS. 15A and 15B.
Figure 20:
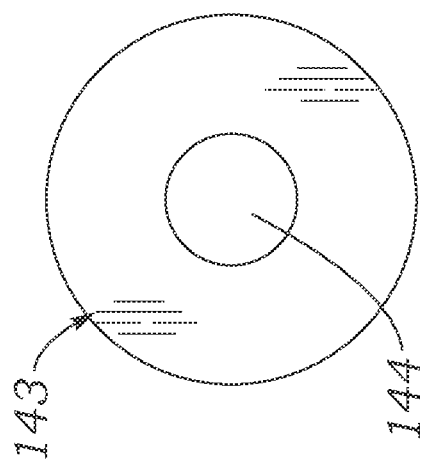
FIG. 20 is a plan view of the spring retainer plate of the tube assembly of FIGS. 15A and 15B.
Figure 43:
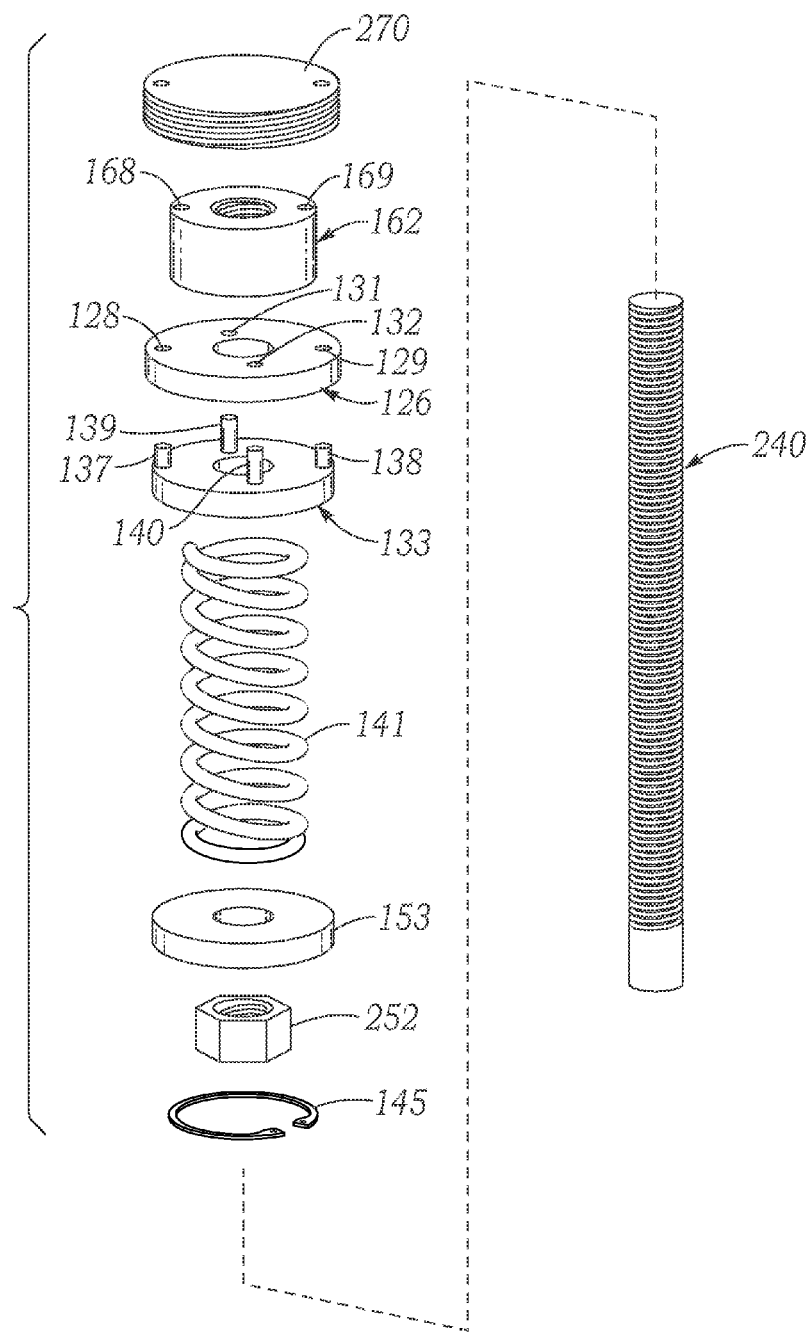
FIG. 43 is an exploded upper perspective view of the components of FIG. 42.
Figure 44:
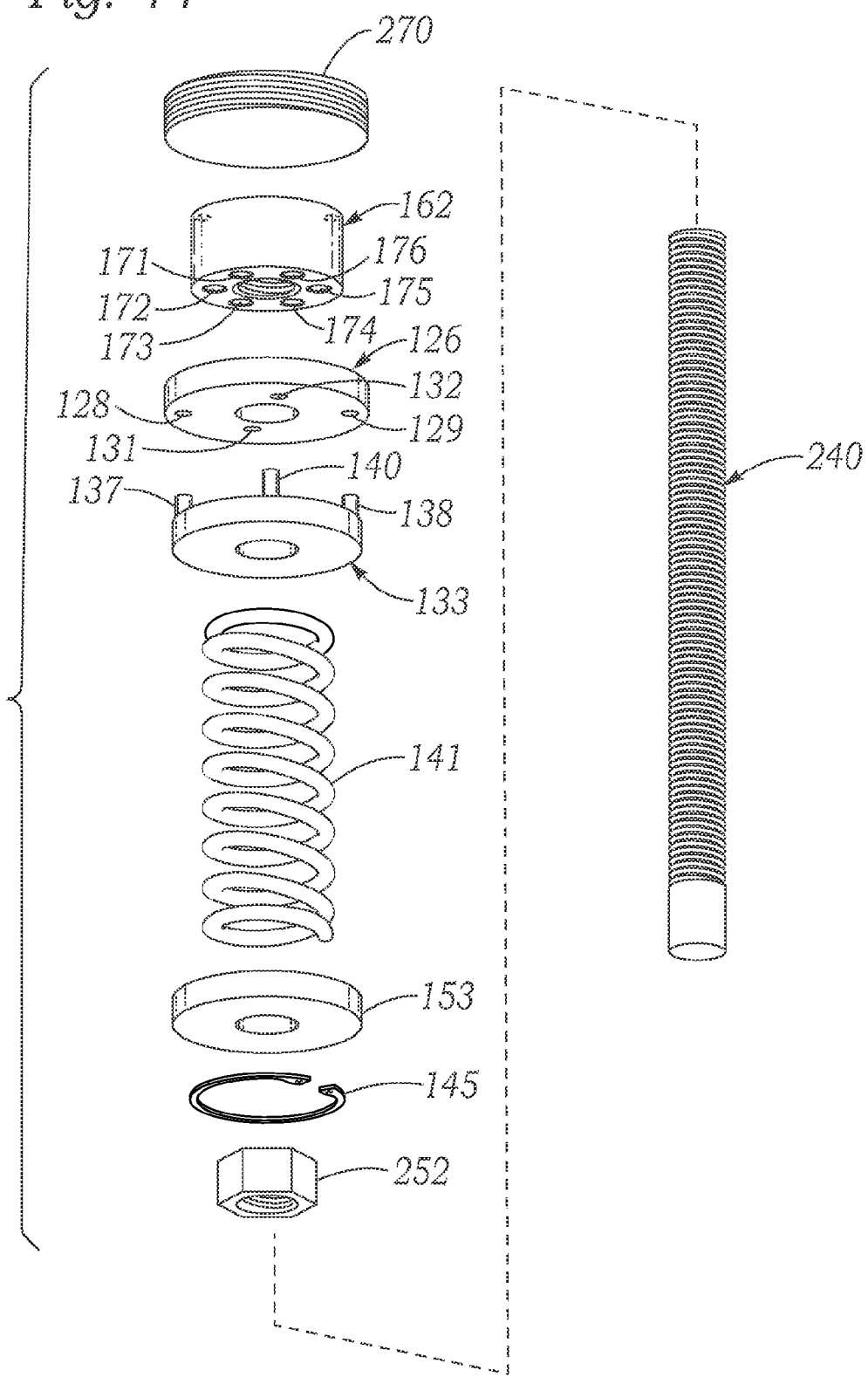
FIG. 44 is a lower perspective view of the components of FIG. 43.
Figure 45:
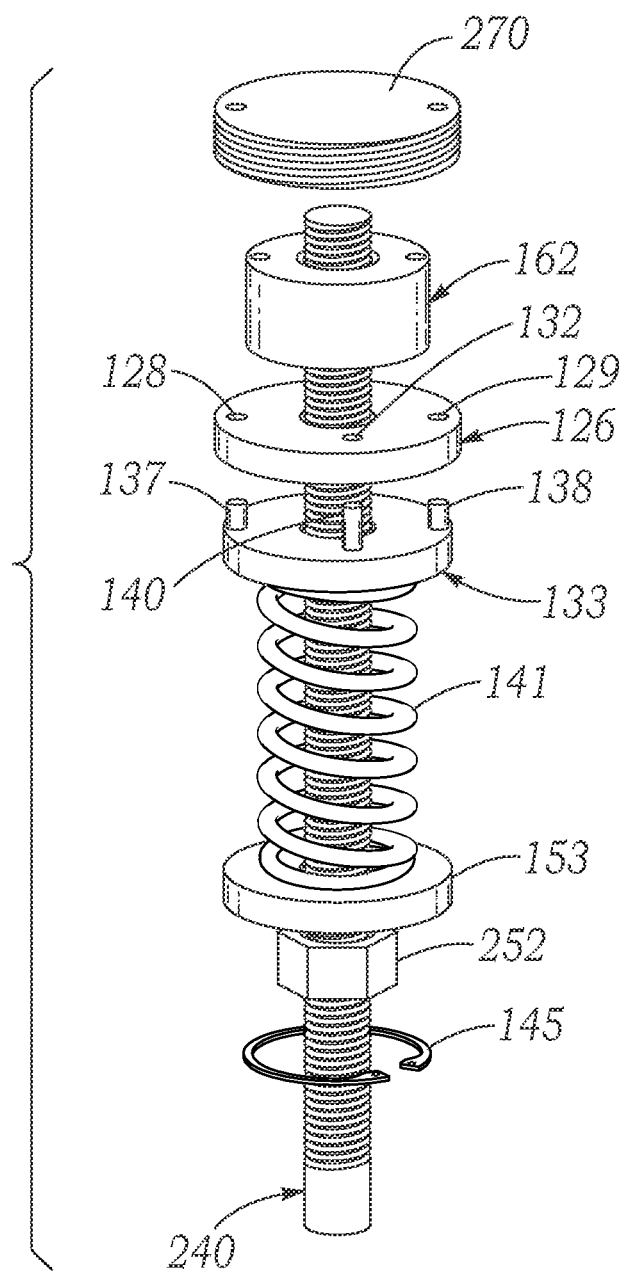
FIG. 45 is a partly assembled view of the components of FIG. 43.

As shown in FIGS. 19 and 43, floating locking pin plate 133 has extending perpendicularly upwards from the upper surface 133A of base plate 135 thereof a pair of outer short axially disposed guide pins 137, 138 which are located near the outer circumference of the base plate at the same radial positions relative to the center of base plate 135 of the locking pin plate as outer perforations 128, 129 of fixed locking pin guide plate 126. Thus guide pins 137, 138 are axially aligned with and longitudinally slidable within perforations 128, 129, respectively.

Floating locking pin plate 133 also has extending perpendicularly upwards from upper surface 133A of base plate 135 a pair of axially disposed locking pins 139, 140, which are located close to the center of the plate. Locking pins 139, 140 are located on a diameter of base plate 135 which is oriented 90 degrees relative to a line joining guide pins 137, 138. Locking pins 139, 140 are located at the same radial positions relative to the center of base plate 135 as the inner perforations 131, 132 through fixed guide plate 126. Thus locking pins 139, 140 are axially aligned with and longitudinally slidable within perforations 131, 132.

As shown in FIGS. 19 and 43, locking pins 139, 140 of floating locking pin plate 133 are longer than guide pins 137, 138.

As shown in FIG. 41-43, the above described construction of fixed guide plate 126 and floating locking pin plate 133 enables the floating locking pin plate to move longitudinally within lower part 142 of bore 127 in lower section 125 of tubular housing 117 of tubular locking assembly 116. The radially outwardly located, short guide pins 137, 138 of the floating locking pin plate are longitudinally slidably received in outer guide plate perforations 128, 129. The radially inwardly located, longer inner locking pins 139, 140 are longitudinally slidably received in inner perforations 131, 132 of the fixed guide plate 126.

Referring now to FIGS. 10-15B, it may be seen that each tubular locking assembly 116 includes a longitudinally elongated, open-coil helical compression spring 141 which is disposed longitudinally within the lower part 142 of bore 127 through lower tubular section 125 of locking tube housing 117 located below fixed locking pin guide plate 126. As shown in FIG. 15B, the lower end coil of compression spring 141 is retained in bore 142 by an annular ring-shaped spring retainer plate 143 which has through its thickness dimension a coaxially centrally located through-bore 144. Spring retainer plate 143 is retained within bore 142 by a C-shaped locking ring 145 which fits in an annular ring-shaped groove 146 in the inner cylindrical wall surface 147 of lower tubular section 125 of locking tube housing 117, a short distance longitudinally inward of the lower transverse end wall 148 of the lower tubular section.

As shown in FIG. 15B, an upper coil of compression spring 141 exerts a resilient spring force against the lower face 149 of floating locking pin plate 133. Thus positioned, compression spring 141 urges floating locking plate 133 upwards so that the upper surface 150 of the floating locking pin plate abuts the lower surface 151 of fixed locking pin guide plate 126. In this upper position, the shorter, outer guide pins 137, 138 extend upwardly through guide pin holes 128 and 129 in fixed locking pin guide plate 126, and longer, inner locking pins 139, 140 extend upwardly through inner, locking pin holes 131 and 132 through the fixed guide plate, to maximum extensions above the upper surface 152 of the fixed guide plate.

As shown in FIGS. 32A and 32B, the central circular bore 144 through the spring retainer plate 143 at the lower end of tubular locking anchor assembly 116, the central circular bore 136 through floating locking pin plate 133, and the central circular bore 126A through fixed locking pin guide plate 126 are axially aligned and adapted to receive insertably therethrough the upper end of the externally threaded shank of a stud 240. The lower end of stud 240 is threaded into the threaded bore 236 of a bolt anchor 230 installed in a blind bore b bored into a concrete base C of a pull box recess B, in a manner to be described below.

Referring now to FIGS. 22-26, it may be seen that a wire protection method and apparatus 50 according to the present invention includes a novel locking collar nut 162. As shown in FIGS. 22-26, locking collar nut 162 includes a short right cylindrically-shaped circular cross-section body 163. Body 163 has through its thickness dimension a centrally located, axially disposed bore 164. Bore 164 has a threaded inner wall 165 that is threadable onto the shank 155 of a stud 156.

As shown in FIGS. 22-26, body 163 of locking collar nut 162 has a flat transversely disposed annular ring-shaped upper face 166, and a flat transversely disposed annular ring-shaped lower face 167. As shown in FIGS. 25 and 26, upper face 166 of locking collar nut body 163 has extending perpendicularly downwards into the body a pair of diametrically opposed, axially disposed blind spanner wrench drive lug bores 168, 169, which are adapted to insertably receive a pair of axially downwardly extending drive lugs of a spanner wrench.

Referring to FIGS. 22 and 24, is may be seen that lower face 167 of locking collar nut body 163 has extending perpendicularly upwards into the body three pairs of diametrically opposed, axially disposed blind locking pin bores 170-171, 172-173, and 174-175 which are each adapted to receive the diametrically opposed pair of longer, inner locking pins 139 and 140 protruding upwards from floating locking plate 133 through perforations 131, 132 in fixed guide plate 126.

As will be described later, a pair of locking collar nuts 162 are used to fasten security lid 110 to a pull box 51.

FIGS. 27-32 illustrate a novel kit of tools which are used according to the present invention to secure a pair of collar nuts 162 to a pair of studs 156 and thereby fasten security lid 110 to pull box 51.

Referring now to FIGS. 27-32, it may be seen that tool kit 181 includes a compression key 182 which is used to depress radially outwardly located guide pins 137, 138, which protrude upwards from floating guide plate 133 through holes 128 and 1129 through fixed guide plate 128.

Tool kit 181 also includes a compression ring 183 which is threadably tightenable into the threaded bore 184 of tubular locking assembly housing 117 to thereby exert a downward compressive force on an upper annular surface of compression key 182.

Figure 12:
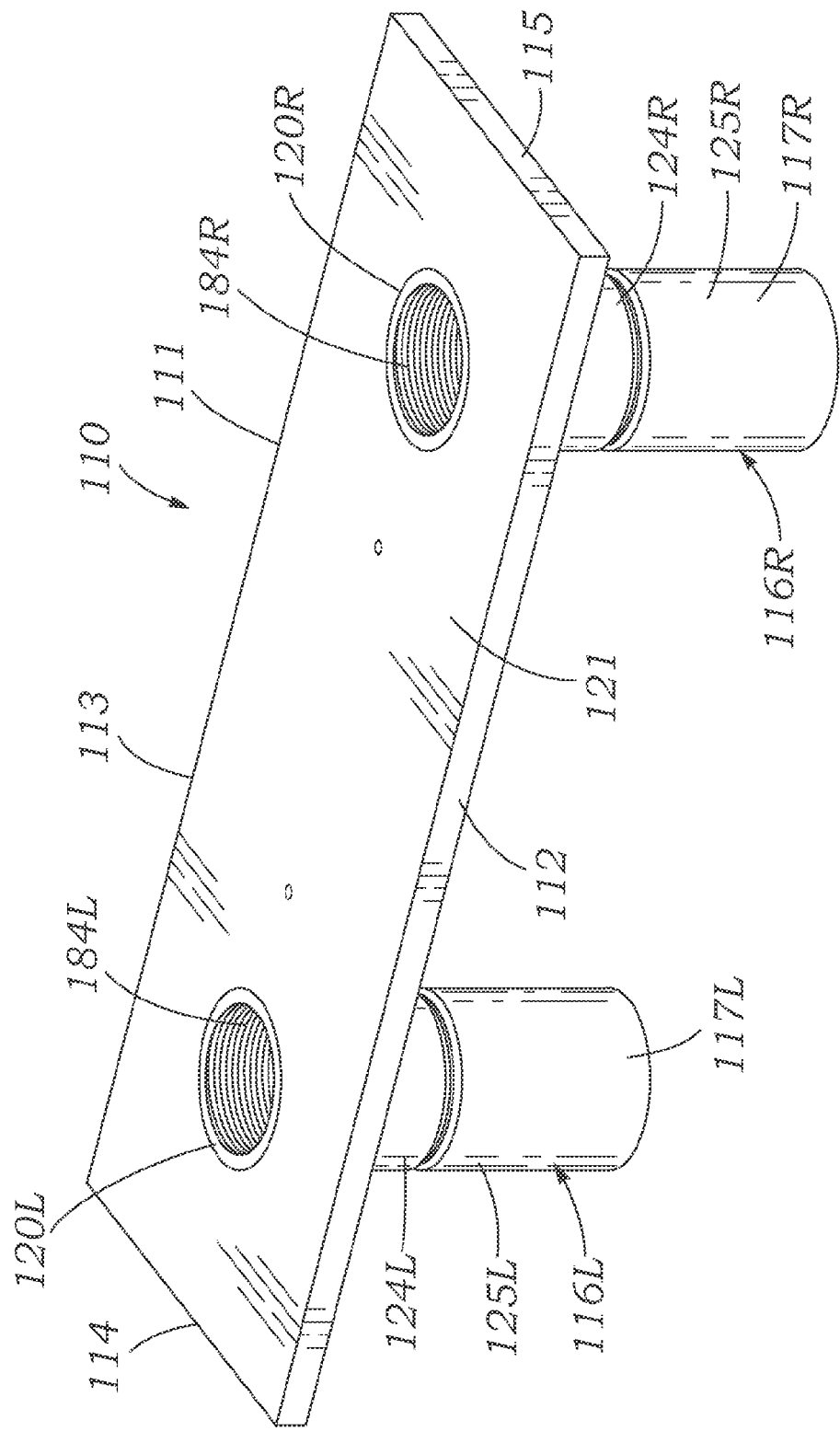
FIG. 12A is an upper perspective view of the lid of FIG. 11.
FIG. 12B is a slightly oblique upper view of the lid of FIG. 11.

Also included in tool kit 181 is a compression ring spanner wrench 185 which is used to threadably tighten and loosen compression ring 183 in bore 184 of tubular locking assembly housing 117 (see FIGS. 12 and 15B).

Tool kit 181 includes a locking collar nut spanner wrench 186 which is used to threadably tighten a locking collar nut 162 onto the threaded shank 155 of a stud 240.

As shown in FIGS. 15 and 27-31, toolkit 181 preferably is constructed as a telescopically nestable set of tubular components which are maintained in a compact telescopically nested storage and transport configuration by an elongated retainer pin 187 which is inserted through aligned transversely disposed retainer pin bores through certain of the components. The retainer pin 187 is held frictionally within the retainer pin bores, and withdrawn by a workman to enable access to individual tool components which are used at an installation site to install the wire theft protection system according to the present invention. The structure and function of each of the foregoing components of tool kit 181 will now be described.

Figure 31:
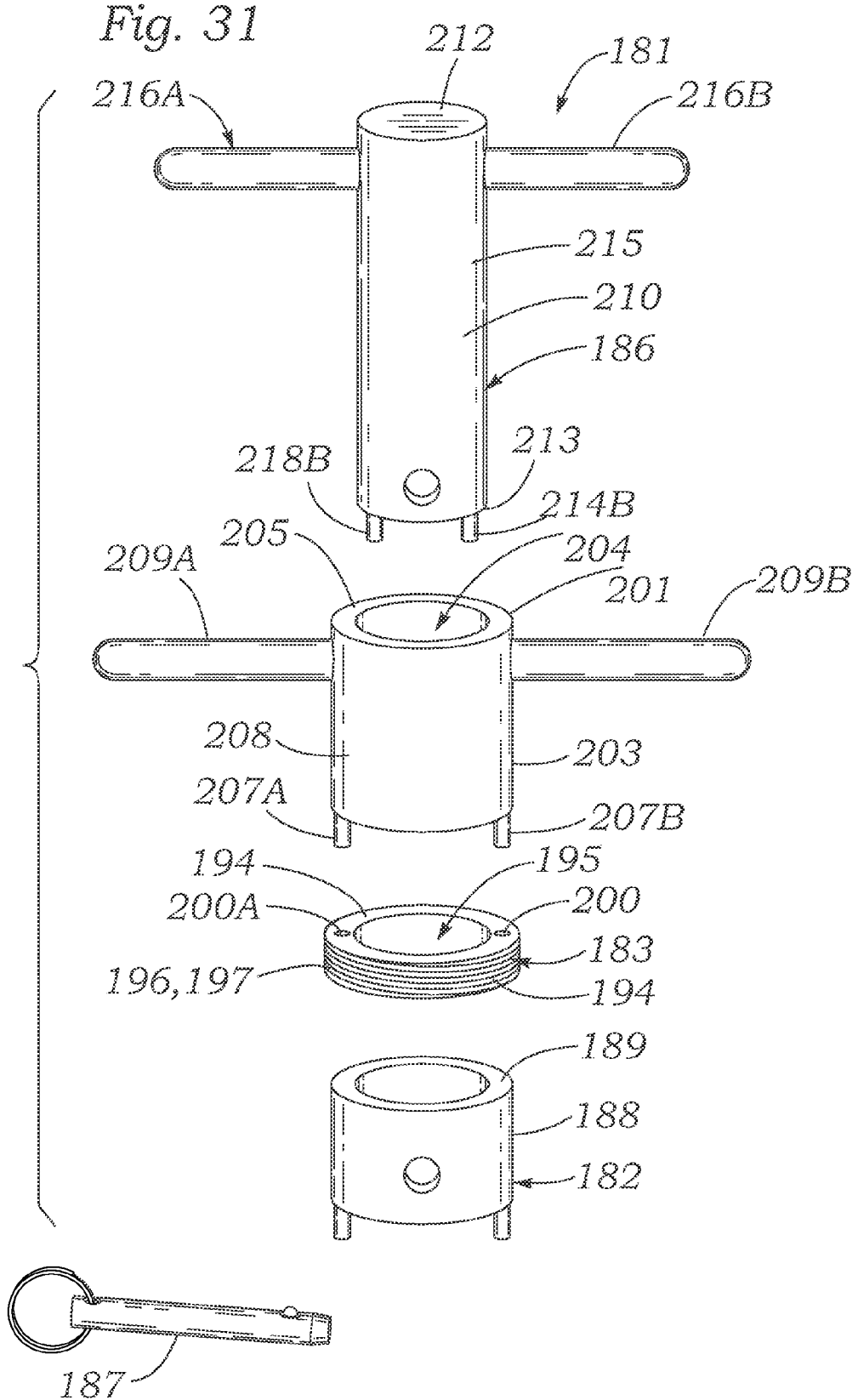
FIG. 31 is an exploded upper perspective view of the tool kit of FIG. 22.

Referring to FIGS. 30 and 31, it may be seen that compression key 182 has a short, hollow, cylindrical ring-shaped body 188. Body 188 has a transversely disposed, flat, annular ring-shaped upper face 189. Body 188 of compression key 182 also has a transversely disposed, flat, annular ring-shaped lower face 190. Compression key 182 has a pair of diametrically opposed, longitudinally disposed, cylindrically-shaped drive pins 191A-191B which protrude downward from lower annular face 190 of compression key body 188.

Drive pins 191A-191B of compression key 182 have the same relative position and diameters as outer guide pin pair 137-138 which protrude upwardly from upper surface 137 of floating locking pin plate 133 through pin guide perforations 128, 129 of fixed locking pin guide plate 126. This construction enables the drive pin pair 191A-191B of compression key 182 to exert a downward pressure on guide pin pair 137-138 of floating locking pin plate 133 and thus depress floating pin plate 133 against the spring force of compression spring 141, when a downward compressive force is exerted on upper annular face 189 of compression key body 188. Such a downward compressive force may be provided by compression ring 183, as will now be described.

As shown in FIGS. 30 and 31, compression ring 183 has a body 194 which has the shape of a short, circular cross-section, cylindrically shaped sleeve which has disposed coaxially therethrough a relatively large circular cross-section bore 195. Body 194 of compression ring 183 has formed in the outer cylindrical wall 196 thereof a helical threaded surface 197. Body 194 of compression ring 183 has a flat, annular ring-shaped lower transverse surface 198, and a flat, annular ring-shaped upper transverse surface 199. Upper transverse surface 199 of compression ring 183 has extending perpendicularly downward into the surface a pair of diametrically opposed, compression ring spanner wrench drive lug bores 200A, 200B.

Referring to FIGS. 30 and 31, it may be seen that tool kit 181 includes a compression ring spanner wrench 201. As will be described later, compression ring spanner wrench 201 is used to threadably drive compression ring 183 into and out of threaded bore 184 which extends downwards into upper tubular section 124 of housing 117 of tubular locking assembly 116 from the upper transverse annular end face 120 of the housing.

As shown in FIGS. 30 and 31, compression ring spanner wrench 201 has a longitudinally elongated, circular cross-section tubular body 203. The body 203 of compression ring spanner wrench 201 has the shape of a hollow right circular cylinder which has a relatively large diameter central coaxial bore 204 that extends through the length of the cylinder. Bore 204 penetrates an upper flat annular ring-shaped transversely disposed end face 205 and a lower transversely disposed end face 206 of wrench body 203.

As may be seen best by referring to FIGS. 30 and 31, lower annular end face 206 of compression ring spanner wrench 201 has protruding perpendicularly downwards therefrom a pair of diametrically opposed cylindrically-shaped circular cross-section drive lugs 207A, 207B. Drive lugs 207A, 207B are of the appropriate size and location to be longitudinally insertably receivable in drive lug blind bores 200A, 200B in the upper surface 194 of compression ring 183.

As shown in FIGS. 30 and 31, compression ring spanner wrench 201 has protruding radially outwards from the outer cylindrical wall surface 208 of spanner wrench body 203 a pair of diametrically opposed handlebars 209A, 209B. As shown in FIGS. 27-31, handlebars 209A, 209B consist of a pair of straight circular cross-section rods. Preferably, the handlebars 209A, 209B are located near the upper end of spanner wrench body 203, with the upper longitudinal surfaces of the rods located a short distance below the upper transverse annular end face 205 of the wrench 201.

As shown in FIGS. 30 and 31, locking collar nut spanner wrench 186 has a longitudinally elongated, circular cross-section tubular body 210. The body 210 of locking collar nut spanner wrench 186 has the shape of a hollow right circular cylinder which has a relatively large diameter central coaxial bore 211 which extends through the length of the cylinder. Bore 211 terminates in an upper flat transversely disposed circular end wall 212 and a lower transversely disposed end face 213 of wrench body 210.

As may be seen bests by referring to FIGS. 30 and 31, lower annular end face 213 of locking collar nut spanner wrench 186 has protruding perpendicularly downwards therefrom a pair of diametrically opposed cylindrically-shaped circular cross-section drive lugs 214A, 214B. Drive lugs 214A, 214B are of the appropriate size and location to be longitudinally insertably receivable in drive lug blind bores 168, 169 in the upper surface 166 of a collar nut 162.

Referring still to FIGS. 30 and 31, it may be seen that locking collar nut spanner wrench 186 has protruding radially outwards from outer cylindrical wall surface 215 thereof a pair of diametrically opposed handlebars 216A, 216B. The handlebars 216A, 216B consist of a pair of straight circular cross-section rods. Preferably handlebars 216A, 216B are located near the upper end of spanner wrench body 210, with the upper longitudinal surface of the rods located a short distance below the upper transversely disposed end wall 212 of the wrench 186.

FIGS. 33-44 illustrate a method for protecting against theft of copper wire interconnected within wall-mounted pull boxes. The method according to the present invention is useable to retrofit an already installed wall-mounted pull box A of the type shown in FIGS. 1 and 2 and described above, to upgrade the installation by protecting against copper wire theft. The method is also useable to install a new pull box 51 of the type shown in FIGS. 3-6 with the novel wire theft protection features according to the present invention.

Figure 33:
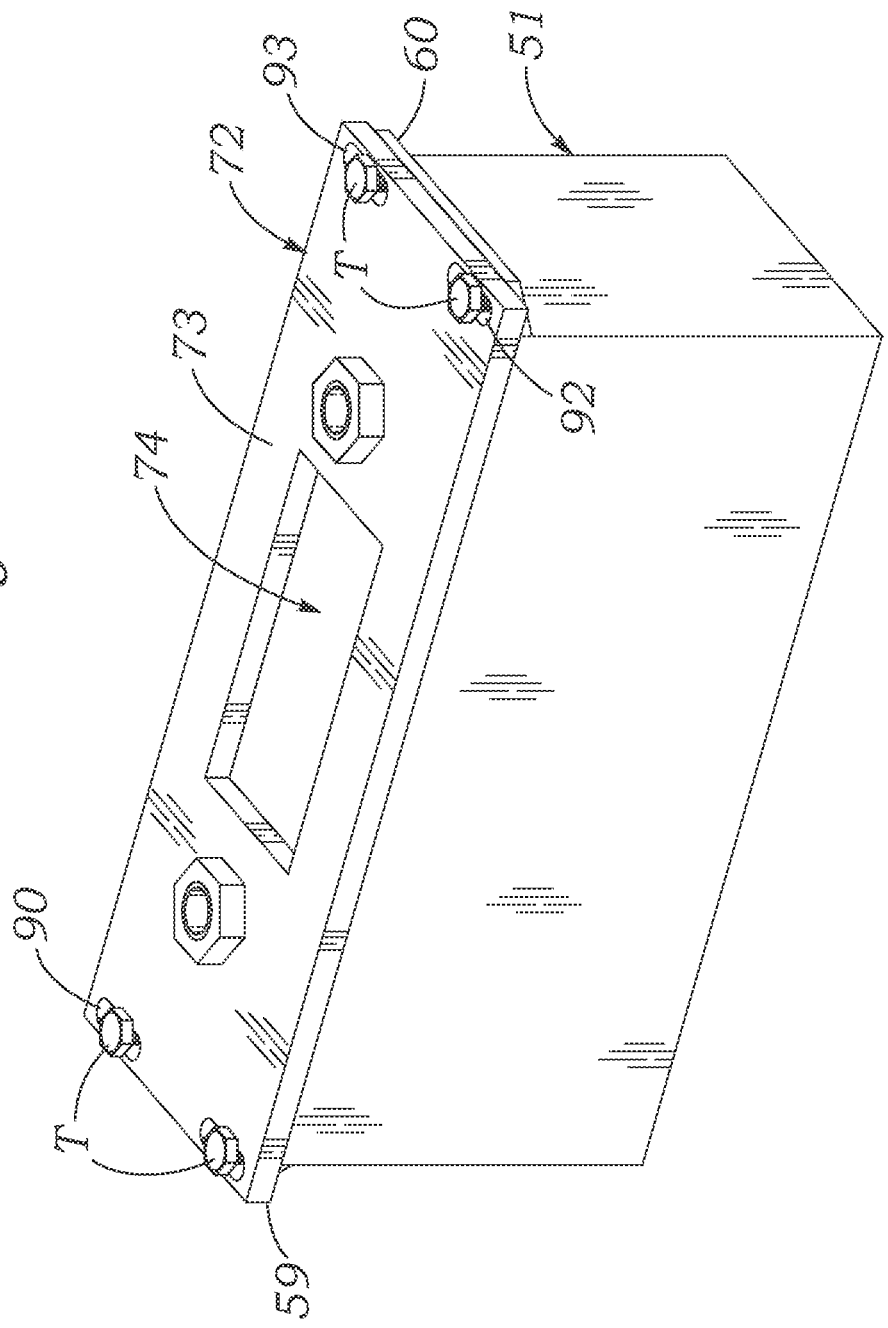
FIG. 33 is a perspective view showing a first step in installing a wire theft protection system using the drill fixture of FIGS. 7-10.

Referring now to FIGS. 1, 2 and 33, it may be understood that a first step in installing a copper wire theft protection apparatus 50 according to the present invention consists of shutting off electrical power supplied to a pull box A or 51.

Second, the existing cover lid Q of the pull box A is removed, as shown in FIG. 2.

Third, the base plate 73 of drill fixture 72 is bolted to pull box A or 51. (For the remainder of the description of the method and apparatus according to the present invention, reference will be made only to pull box 51, it being understood that the method and apparatus are useable with a previously installed pull box A, as shown in FIGS. 1 and 2).

As shown in FIG. 33, base plate 73 of drill fixture 72 is secured to pull box 51 by bolts T inserted through slotted holes 89, 90, 92 and 93 through the base plate and tightened into threaded fasteners 61 in left and right fastener flanges 59, 60 of the pull box.

As shown in FIG. 34, a fourth step in the method according to the present invention consists of inserting the fluted shaft U of an elongated concrete drill bit V into the bore 82 of a first drill bit guide tube, e.g., right-hand drill fixture guide tube 75R of drill bit fixture 72. The drill bit shaft U is inserted sufficiently far into bore 82 of drill bit guide tube 75R for the point W of the drill bit to contact the upper surface 54A of bottom wall panel 54 of pull box 51. Then, as shown in FIG. 34, the upper transverse end face of shank X of drill bit V is struck by a hammer Y, with sufficient force to cause the drill bit point to form an indentation in the upper surface of the bottom wall panel of the pull box. The indentation serves as a center marking point for a first hole h to be subsequently formed through bottom wall panel 54 of pull box 51.

A fifth step of the method of the present invention consists of withdrawing drill bit V from a first drill fixture, guide tube, e.g., right-hand guide tube 75R, inserting the drill bit into the second of the two guide tubes of the drill fixture, e.g., left-hand guide tube 75L, and repeating the steps described above to make a second indentation in bottom wall panel 54 of pull box A which will serve as a center marking point for the second one of two holes to be subsequently formed through the bottom wall panel of the pull box.

Figure 39E:
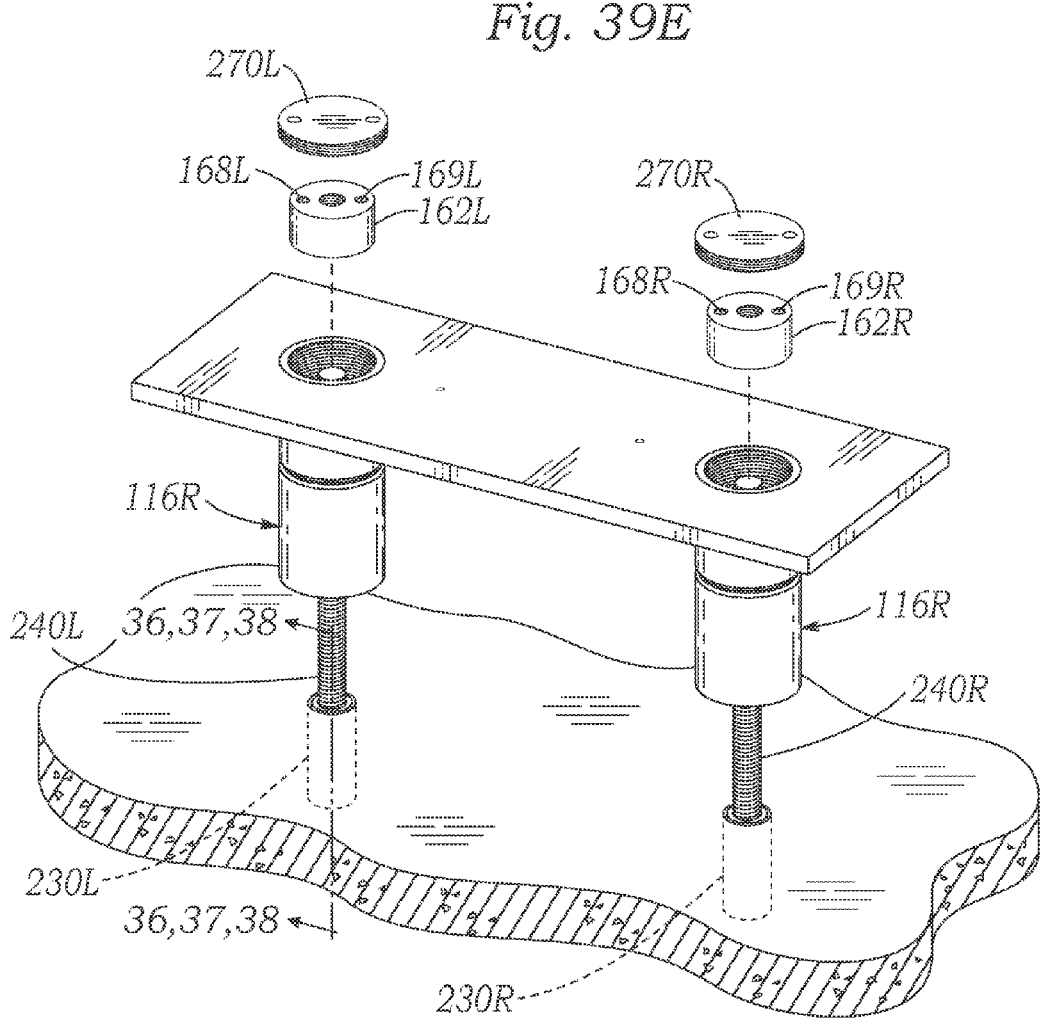
FIG. 39E is a perspective view showing a pair of anchor studs threaded into concrete bolt anchors.

As shown in FIGS. 35 and 39A, following step 5, a pair of panel holes h1, h2 are bored through the bottom wall panel 54 of pull box 51 at the locations marked as described above. As shown in FIG. 39B, blind bores b are then bored below the panel holes h in a concrete base C of a recess B in which pull box 51 is installed. The panel holes h through base wall panel 54 of pull box 51 and blind bores b1 in concrete base d1 may be made in a single boring operation for each of the left and right panel hole/blind bore pair by a single boring operation of drill bit V.

Optionally, a sixth step may be performed in which the drilling guide fixture 72 may be unbolted from the pull box 51 and removed. A hole saw is then used to sever two circular metal slugs from bottom wall panel 54 of pull box 51, centered on the two indentations in the bottom wall panels. The hole saw is then withdrawn from the interior of the pull box.

Seventh, the drilling guide fixture is once again bolted to the pull box 51, as shown in FIG. 35.

An eighth step in the method according to the present invention consists of re-inserting concrete drill bit V into one of the two drill bit guide tubes, e.g., right-hand guide tube 75R. The shank of the concrete drill bit V is then clamped in the chuck of a power drill Z. The power drill Z is then energized to rotate drill bit V, thus boring a blind bore b1 into concrete base d1 below the bottom wall panel 54 of pull box 51. As shown in FIG. 35, drill bit V has fitted to an upper end part of the shank of the drill bit an annular ring-shaped depth-limiting collar 220. Collar 220 limits the downward movement of drill bit V to thus limit the depth of blind bore b1 formed in concrete base C to a pre-determined length.

A ninth step according to the method of the present invention consists of withdrawing drill bit V from right-hand guide tube 75R, inserting the drill bit into the left-hand guide tube 75L, and rotating the drill bit by a power drill to form a second panel hole h2 and a second blind bore b2 in concrete base C, in exactly the same way as hole h1 and bore b1 were formed.

Step number 10 according to the present invention consists of unbolting drill fixture 72 from pull box 51, and removing the drill fixture.

The eleventh step of the method according to the present invention includes installing a pair of bolt anchors in blind bores b1, b2 in concrete base C of recess B. As shown in FIGS. 36-39C, each of the two identical concrete bolt anchors 230 includes a longitudinally elongated, right cylindrically-shaped tubular body 231. Body 231 has a lower elongated section that has extending longitudinally upwards from the lower annular end wall 232 thereof a series of slots 233, which form therebetween a series of elongated rectangularly-shaped legs 234.

Body 231 of bolt anchor has extending upwardly from a lower annular end wall 232 thereof a radially outwardly tapered, frusto-conically-shaped coaxial bore 235. Bore 235 communicates at an upper end thereof with a uniform diameter inner bore 236 which extends through upper annular end wall 237 of body 231 of bolt anchor 230. A lower part of uniform circular bore 236 holds therein an elongated circular cross-section expander rod 238 which has at the lower end thereof an enlarged diameter head 239 that fits into the larger diameter upper end of tapered bore 235. With this construction, legs 234 may be splayed outwards from body 231 of bolt anchor 230 by inserting an elongated shaft S1 into upper bore 235 until the lower end of the shaft contacts the upper end of the expander rod 238, and striking the upper end of the shaft to thus drive the expander rod 238 downwardly in tapered bore 235.

As shown in FIGS. 36-39, an upper end part of bore 236 in concrete bolt anchor body 231 is helically threaded to receive an elongated threaded stud 240. As shown in FIG. 39C, the outer cylindrical wall 241 of a lower longitudinally disposed part of body 231 of bolt anchor 230 preferably has formed therein a knurled surface 242. Knurled surface 242 is provided to produce frictional gripping of the bolt anchor within a blind bore b.

According to an eleventh step of the method of the present invention, a bolt anchor 230 is preferably prepared for installation in a blind bore b in concrete base d by first coating the lower knurled surface 242 of the bolt anchor body with an adhesive such as a liquid epoxy. The bolt anchor 230 is then inserted into a blind bore b. An elongated shaft is then driven downward against the upper end of expander rod 238 to thus expand the legs 234 of the bolt anchor into contact with inner wall surface of the blind bore b, and sufficient time allowed for the liquid adhesive to solidify.

FIG. 36-39 illustrate a thirteenth step in the method according to the present invention. As shown in FIGS. 36-39, that step includes inserting a separate one of a pair of straight, elongated threaded studs 240L, 240R into the threaded bores 251L, 251R of concrete bot anchors 230L, 230R which have been secured in bores b1, b2 in concrete base C in the manner described above. Threaded studs 240L, 240R are threadably tightened into threaded bores 251L, 251R of bolt anchors 230L, 230R by any convenient means, such as by gripping the upper end of a stud with a tool such as pliers or vise-grip wrench, and orbiting the tool about the longitudinal axis of the stud.

As may be understood by referring to FIGS. 39A and 39D, a fourteenth step of the method according to the present invention includes threading a separate one of a pair of hex stop nuts 252L, 252R onto the upper end of each stud 240L, 240R, to a pre-determined distance below the upper transverse end face 253L, 253R of the shank 254L, 254R of the stud.

As shown in FIGS. 39A through 39D, a fifteenth step in the method according to the present intention includes positioning locking security lid 110 above and in congruent alignment with the rectangular upper opening 255 of the open interior space 256 of pull box 51. The security lid 110 is then lowered towards the upper ends of the studs 240L, 240R so that the studs are insertably received upwardly through central coaxial bores 257L, 257R of left and right tubular locking assemblies 116L, 116R, respectively.

The security lid 110 is lowered until further downward movement of the lid is halted by contact of the lower surfaces 258L, 258R of bottom spring retainer plates 143L, 143R of locking tube assemblies 116L, 116R, with upper transverse end faces 259L, 259R of depth-limiting hex nuts 252L, 252R, as shown in FIG. 39D. In this depth-limited position, the upper surface of locking security lid 110 is coplanar with or slightly below the upper horizontal surfaces of side-mounted flanges 59 and 60 of pull box 51. Also, as shown in FIGS. 39A and 39B, in the foregoing depth-limited position of security lid 110, the upper end faces 253L, 253R of threaded studs 240L, 240R are recessed below the upper surface 250 of the locking security lid.

Steps sixteen through twenty-one of the method of the present invention are used to lock security lid 110 to studs 240L, 240R, as will now be described. With security lid thus locked, access to copper wires in the interior space of box 51 by thieves is thwarted. FIGS. 18 through 45 illustrate the novel method of securing lid 110 to box 51 using novel apparatus and tools according to the present invention.

FIGS. 19, 41, 42, 43, 44 and 45 show the arrangement of components of the present invention which are used to secure each of the two tubular locking assemblies 116L, 116R of security lid 110 to a separate one of the studs 240L, 240R shown in 30A, 39B, 39D and 40, thus securing lid 110 to pull box 51.

Referring first to FIGS. 19, 39A, 3B, 39C, it may be seen that a sixteenth step according to the present invention comprises securing security lid 110 to studs 240R, 240L. In this step, tubular compression key 182 is inserted into the open upper end 261 of bore 260 of a tubular locking assembly 116, and slid inward into the bore 260 of the locking assembly until the drive pins 191A, 191B protruding downwards from the lower annular surface of compression key 182 contact the upper ends of guide pins 137, 138 which protrude upward from floating locking pin plate 133 through perforations 128, 129 of fixed guide plate 126.

According to a seventeenth step of the method according to the present invention, compression ring 183 is threaded into an internal threaded part 262 of bore 260 of tubular locking assembly 116. Compression ring 183 is threadably advanced downwards into bore 260 of tubular locking assembly 116 by inserting compression ring spanner wrench 201 downward into bore 260 of the tubular locking assembly to thus insert spanner wrench drive pins 207A, 207B into blind drive bores 200A, 200B of compression ring 183. Torque is then exerted on compression ring spanner wrench 201 by handlebars 209A, 209B to thus threadably tighten compression ring 183 down against the upper annular surface of the compression key 182. Downward compressive force on compression key 182 causes compression key drive pins 191A, 191B to push aligned floating locking pin plate guide pins 137, 138 and floating locking pin plate 133 downwards. When floating locking pin plate 133 has been pushed sufficiently far downwards, the upper ends of locking pins 139, 140 of the floating locking pin plate are depressed flush with the upper surface of fixed guide plate 126.

As shown in FIGS. 41-45, an eighteenth step of the method according to the present intention includes aligning the threaded bore 264 of a locking collar nut 162 with the upper end face 263 of a stud 240, and threadingly advancing the locking collar nut downward onto the stud. Locking collar nut spanner wrench 186 is then inserted downwardly into the upper opening 261 of tubular locking assembly 116, to thus insert the drive pins 214A, 214B which protrudes downwardly from the lower annular end face of the locking collar nut spanner wrench into blind drive pin bores 168, 169 in upper end face of locking collar nut 162. Locking collar nut spanner wrench 186 is then twisted about its longitudinal axis by grasping and orbiting handlebars 216A, 216B of the wrench to thus torque locking collar nut 162 threadably downwards on stud 240, until the lower annular surface of the locking collar nut seats on the upper face of fixed locking pin guide plate 126.

A twentieth step of the method according to the present invention consists of turning the larger diameter compression ring driver spanner wrench 201, which fits coaxially over the locking collar nut spanner wrench 186, in a counterclockwise sense. This counterclockwise twisting advances compression key upwards slightly in the threaded bore of tubular locking assembly 116. Threadably upward movement of compression ring 183 in turn relieves downward pressure exerted by the compression ring on the upper annular surface of the compression key 182. This, in turn, enables guide pins 137, 138 of floating guide pin plate 133 to move upwardly in guide pin perforations 128, 129 of fixed guide pin plate 126, in response to an upward force exerted on the lower surface of the floating guide pin plate 133. Upward motion of floating guide pin plate 133 also urges locking pins 139, 140 of the floating guide pin plate upwardly in perforations 131, 132 of the fixed guide pin plate, thus causing upper ends of the locking pins to press against the lower annular surface of locking collar nut 162.

A twenty-first step of the method according to the present invention includes twisting the locking collar nut spanner wrench 126 counterclockwise no more than sixty degrees, slightly loosening the locking collar nut. The locking collar 162 is twisted just far enough for the diametrically opposed locking pins 139, 140 to become longitudinally aligned with a pair of blind bores 170 and 171 in the lower annular end face of the locking collar nut. When such alignment occurs, locking pins 139, 140 spring upwardly through perforations 131 and 132 through fixed locking pin guide plate 126, and into a pair of blind bores such as bores 170-171 in the lower annular end wall of locking collar nut 162. Since floating locking pin plate 133 and locking pins 139, 140 are fixed against rotation about the longitudinal axis of stud 240, because the locking pins and guide pins of the floating locking pin plate are disposed through perforations in the fixed locking pin guide plate 126, locking collar nut 162 is prevented from being threadably loosened from stud 240.

With the locking collar nut 162 threadably tightened onto the threaded anchor stud 240 down against the upper surface of the fixed perforated guide plate 126 of the tubular locking assembly 116 of the security lid 110, the lower, surface of the spring retainer plate 143 at the lower end of the tubular locking assembly is pressed against the upper surface of the hex nut 252 which was initially threaded onto a threaded stud 240 to a predetermined distance below the upper end face of the stud. That distance is selected to position the upper surface of the security lid plate 110 flush with the upper surface of the wall-mounted pull box 51, and the upper end of the stud a short distance below the upper surface of the security lid plate. The distance is sufficient to receive an externally threaded cap 270 which is later threaded into the upper end of a threaded bore of the locking tube assembly.

Twenty-second, steps sixteen through twenty-one are repeated to fasten the second tubular locking assembly 117L of the security lid to the second anchor stud 2240L.

Twenty-third, a separate threaded cap 270 is threadably tightened into the upper end of each of the two tubular locking assemblies 116.

Twenty-fourth, an original weather cover that was removed from a pull box, or a new weather cover, is re-fastened by bolts to the box above the security lid 110.

Notably, not all of the pull boxes in a daisy chain sequence of pull boxes need to be retrofitted or originally installed using the novel copper wire theft protection method and apparatus according to the present invention. Typically, only every other pull box in a daisy chain needs to be protected according to the present invention. Moreover, since the method includes installation of the original or new removable weather cover, which conceals the security lid, thieves would have to go to the trouble of removing the weather cover to ascertain whether or not a particular pull box is protected by a security system according to the present invention.

It should be noted that some variations may be made to the novel method and articles of the present invention which are within the scope of the claims. For example, those skilled in the art will recognize that certain steps of the method may be combined, such as the steps of forming a clearance hole in the bottom wall panel of a junction box and forming an anchor bore in a concrete body below the bottom wall panel, which could be combined into a single drilling operation. Also, the order of certain steps may be varied, or certain steps eliminated, as for example, when a new junction box according to the present invention is used to replace a previously installed junction box according to the present invention.

FIGS. 40C and 40D illustrate a first modification of the copper wire theft protection method and apparatus for wall-mounted pull boxes described above. The modified apparatus 50A shown in FIGS. 40C and 40D is identical in construction, function and installation method to apparatus 50 described above, except for the fact the security lid 110A of apparatus 50A has a square plan view shape adapted to fit to a square pull box 51A, and includes a single locking tube assembly 116A and a single threaded stud 240A, rather than a pair of locking tube assemblies and studs.

FIG. 46 illustrates another modification of the copper wire theft protection method and apparatus for wall-mounted pull boxes described above. The modified apparatus 50B shown in FIG. 46 is substantially similar in structure and function to apparatus 50 described above, but includes in addition to the component parts of apparatus 50 an elongated rectangular guide plate 280 which facilitates installation of the apparatus 50B on a pull box 51. As will be described in detail below, guide plate 280 also further protects pull box 51 against intrusion by potential wire thieves. Thus plate 280 serves both as a guide plate and a security plate.

Also described below is a modified method of installing wire protection apparatus 50B which eliminates the requirement for bolt anchors 230, and improves the installation method according to the basic embodiment of the invention described above.

As shown in FIG. 46, modified wire protection apparatus 50B is adapted for use with a pull box 51B which differs slightly from pull box 51 shown in FIGS. 3-6 and described above. Thus, specifically pull box 51B has front and rear lip flanges 55A, 56A, which are shown to be somewhat wider than those of pull box 51 shown in FIG. 4, and pull box 51A is shown without left and right lip flanges 59, 60 shown for pull box 50 in FIGS. 5 and 6. However, pull box 51B may optionally have left and right lip flanges.

Referring now to FIG. 46, it may be seen that modified wire protection apparatus 50B includes an installation guide and security plate 280 which has generally a laterally elongated, rectangular-shaped flat lower base plate 281, front and rear thin, laterally elongated rectangularly-shaped vertical flanges 282, 283 which extend vertically upwards from front and rear edges 284, 285 of the base plate, and front and rear thin, laterally elongated front and rear horizontal lip flanges 286, 287 which extend forward and rearward, respectively, of front and rear upper edges 288, 289 of the front and rear vertical flanges 282, 283.

As shown in FIG. 46, a shallow laterally elongated rectangularly-shaped channel 293 is formed between the upper surface 290 of guide base plate 281, and inner vertical surfaces 291, 292 of front and rear vertical flanges 282,m 283. Channel 293 is of the appropriate size and shape to receive conformally downwardly there into a security id 110B, with tubular locking assemblies 116L, 116R which depend downwardly from base plate 111B of the security lid being received insertably downwards through left and right circular clearance holes 294, 295 which penetrate base plate 281 of guide plate 280.

Referring still to FIG. 46, it may be seen that base plate 111B of security lid 110B has through its thickness dimension a pair of laterally spaced apart left and right screw holes 296, 297 which are located equal distances laterally inwards from left and right tubular locking assemblies 116L, 116R, and equidistant from front and rear edges of 112B, 113B of the security lid base plate. As is also shown in FIG. 46, base plate 281 of guide plate 280 has through its thickness dimension a pair of screw holes 298, 299 which are vertically alignable with holes 296, 297, respectively, through security lid base plate, thus enabling the security lid 110B to be bolted into channel 293 of guide plate 280 and secured to the guide plate by screws 300, 301 threadably tightened into the holes.

As is also shown in FIG. 46, front horizontal lip flange 286 of pull box guide plate 280 has through its thickness dimension a pair of laterally spaced apart left and right front fastener holes 302, 303, spaced equidistant from left and right edges of the guide plate and rear lip flange 287 ad has through its thickness dimension a par of rear fastener holes 304, 305 which are aligned with the front fastener holes.

As is also shown in FIG. 46, front horizontal lip flange 55A of pull box 51B has through its thickness dimension a pair of laterally spaced apart left and right front fastener holes 306, 307 which are vertically alignable with guide plate front fastener holes 302, 303, respectively, when the guide plate is lowered into the upper opening 311 of pull box 51B to thus rest front and rear lip flanges 286, 287 on front and rear lip flanges 56A, 56B, respectively, of the pull box. Also, rear horizontal lip flange 56A of pull box 51B has through its thickness dimension a pair of laterally spaced apart left and right rear fastener holes 308, 309 which are vertically alignable with guide plate rear fastener holes 304, 305 when the guide plate is lowered into the upper opening 311 of the pull box.

As shown in FIG. 46, modified wire protection apparatus 50B includes a pair of laterally spaced apart holes h1, h2 which are bored through bottom wall panel 54B of pull box 51B using drill guide fixture 72, using the method described above for the basic embodiment 50 of a wire protection apparatus according to the present invention. Also, the method of installing modified wire protection 50B in a recess in a concrete wall includes forming in a concrete base of the recess a pair of laterally spaced apart blind bores b1, b2 which are aligned with panel holes h1, h2, respectively, in the manner described above for the basic embodiment 50 of the apparatus. However, modified apparatus 50B eliminates the requirement for bolt anchors 230L, 230R used in the basic embodiment 50 of the apparatus as described above and shown in FIGS. 39A, 39B. Also, the method of installing modified wire protection apparatus 50B differs from the method described above of installing basic embodiment 50, as is described below.

According to the modified installation method used to install modified pull box 50B in a recess in a concrete structure, a pair of elongated straight left and right threaded studs 240L, 240R are anchored in concrete in blind concrete bores b1, b2 in base d of a recess in a concrete structure such as the base of a freeway sound barrier wall, using a method somewhat different from that described above for the basic embodiment 50 of the apparatus, which different method will now be described.

First, as shown in FIG. 46, a separate one of a pair of depth limiting stop nuts 252L, 252R is threaded onto the upper end of the shank 254L, 254R of each threaded stud 240L, 240R, to a pre-determined distance below the upper transverse end face of the shank.

Second, the outer surface of a lower end portion of each stud 240L is coated with construction-grade liquid epoxy cement.

Third, guide plate 280 with security lid 110B bolted into the channel 293 in the upper surface of the guide plate is inserted into the upper opening 311 of the hollow interior space 310 of pull box 51B, until the front and rear lip flanges 286, 287 seat on front and rear lip flanges 55A, 56A, respectively, of the pull box. As may be understood by referring to FIG. 39A, as guide plate 280 and attached security lid 110B are inserted into pull box 51B, upper end portions of shanks 254L, 254R of studs 240L, 240R are insertably received into the bores 144L, 144R in bottom spring retainer plate 143L, 143R of left and right tubular locking assemblies 116L, 116R. This third step is performed while the liquid epoxy adhesive on the lower ends of studs 240L, 240R has not yet set, so that the upper ends of the studs may be readily deflected to bring them into alignment with spring retainer plate bores 144L, 144R, facilitating insertion of the studs into the bores.

A fourth step according to the installation method of the present invention consists of fastening guide plate 280 to pull box 51B with fasteners such as screws inserted into aligned hole pairs 302, 306, 303, 307, 304, 308, and 305, 309 though the front and rear lip flanges 286 287 of the guide plate and lip flanges 55A, 56A of the pull box.

A fifth step in the method of installing security lid 110B on pull box 51 consists of allowing sufficient time for the epoxy cement on the lower ends of studs 240L, 240R to set thus securing the studs in concrete bores b1, b2.

A sixth step in the method of installing pull box 51B consists of removing fasteners which secure guide plate 280 to the pull box, and making required connections between wires in the interior space 310 of the pull box.

A seventh step according to the installation method of the present invention consists of re-inserting and fastening guide plate 280 and security lid 110B to pull box 51B descried above. Optionally and desirably, before this seventh step is performed, depth limiting stop nuts 252L, 252R are secured to studs 240L, 240R, respectively, using an epoxy adhesive joint, or other suitable means. Also, optionally and desirably, the upper surfaces 259>, 259R of depth limiting stop nuts 252L, 252R are coated with liquid epoxy, to secure the nuts to the lower surfaces of spring retainer plates 143L, 143R.

The method of installing modified wire protection apparatus 50B includes steps to locking security lid 110B to studs 240L, 240R. These steps are identical to steps sixteen through twenty-four described above for the basic embodiment 50 of the apparatus, in conjunction with FIGS. 18-45.

According to the invention, guide plate 28 may be unfastened from security lid 110B prior to final attachment of the security lid, to be re-used for installation of another pull box. Optionally and desirably, however, guide plate 280 will be left attached to security lid 110 when it is finally attached to pull box 51B, the front and rear vertical flanges 282, 283 preventing intrusion into the interior space of the pull box by potential thieves using a bladed tool such as a screw driver.

What is claimed is:

1. A method for thwarting access to electrical wires interconnected within a pull box-type electrical junction box enclosure of the type which is mounted in a recess in a wall or other concrete body to thereby protect against theft of wire from the enclosure, said method comprising the steps of:
   a. aligning at least a first clearance hole in a bottom wall panel of a junction box shell with a first anchor bore in said concrete body below said bottom wall panel,
   b. inserting a first elongated threaded stud into said first anchor bore through said first clearance hole in said bottom wall panel of said junction box shell,
   c. fixedly attaching said first stud to said concrete body,
   d. positioning a first downwardly depending tubular locking tube of a transversely disposed locking security lid coaxially over said first stud,
   e. lowering said lid to receive an upper end of said shank of said first stud in a bore through said first locking tube sufficiently far for a lower transverse end wall of said locking tube to seat on a stop member located a pre-determined distance below the upper end of said stud, and
   f. fastening said first locking tube to said first stud, and
   g. said locking security lid including,
      (I) an elongated flat base plate,
      (ii) at least a first hollow cylindrically-shaped locking tube having a tubular body which extends perpendicularly downwards from the lower surface of said base plate, said tubular body having an upper cylindrically-shaped section and an axially aligned lower cylindrically shaped section, and a fixed circular locking pin guide plate fixed within a common bore disposed through said upper and lower sections at the junction therebetween, said fixed circular locking pin guide plate having through its thickness dimension a first outer guide pin perforation, and a first inner, locking pin perforation, said locking tube including an annular ring-shaped floating locking plate longitudinally slidably located within a lower part of said bore through said locking tube, said ring-shaped floating locking pin plate having protruding perpendicularly upwards, from the upper surface thereof a first, short guide pin axially aligned with said first guide pin perforation through said fixed locking pin guide plate, and a first, long locking pin axially aligned with said locking pin perforation through said locking pin guide plate, said locking tube including at a bottom end thereof a transversely disposed, annular ring-shaped retainer plate and a compression spring disposed between an upper surface of said spring retainer plate and a lower surface of said floating locking pin plate to thus urge said floating locking pin plate upwards to thereby urge said guide pin of said floating locking pin plate upwards through said axially aligned guide pin perforation through said fixed locking pin guide plate, and said locking pin upwards through said axially aligned locking pin perforation through said fixed locking guide plate, said spring retainer plate, floating locking pin plate and fixed locking pin guide plate having through their thicknesses central axially aligned bores for receiving therethrough the threaded shank of an elongated stud anchorable to said concrete body.

2. The method of claim 1 including forming said first clearance hole in said bottom wall panel of said junction box by a method including the steps of;
   a. attaching a drill fixture to said junction box near an upper open end of said junction box, said drill fixture having a mounting plate disposed transversely to a longitudinal central axis of said junction box shell, said mounting plate having disposed perpendicularly through its thickness dimension at least a first, vertically disposed drill guide tube having disposed axially therethrough a drill bit guide tube bore,
   b. inserting a drill bit downward into an upper opening of said drill bit guide tube bore sufficiently far for the point of said drill bit to contact the upper surface of said bottom wall panel of said junction box shell at a first contact point, and
   c. forming said first clearance hole centered on the contact location of said drill bit point on said bottom wall panel.

3. The method of claim 2 wherein said first anchor bore is formed by a tool which is inserted through said first clearance tool in said bottom wall panel of said junction box.

4. The method of claim 1 further including the steps of;
   a. aligning a second clearance hole in said bottom wall panel of said junction box with a second bore in said concrete body,
   b. inserting a second elongated threaded stud into said second anchor bore through said second clearance hole in said bottom wall panel of said junction box shell,
   c. fixedly attaching said second stud to said concrete body,
   d. positioning a second downwardly depending tubular locking tube of said transversely disposed security lid over said second stud,
   e. lowering said security lid to receive on upper end of said shank of said second stud in a bore through said second locking tube sufficiently far for a lower transverse end wall of said second locking tube to seat on a stop member located a pre-determined distance below the upper end of the shank of said second stud, and
   f. fastening said second locking tube to said second stud.

5. The method of claim 4 further including forming said first and second clearance holes through said bottom wall panel of said junction box by a method including the steps of;
   a. attaching a drill fixture to said junction box near an upper open end of said junction box, said drill fixture having a mounting plate disposed transversely to a longitudinal central axis of said junction box shell, said mounting plate having disposed perpendicularly through its thickness dimension a parallel pair of laterally spaced, vertically disposed first and second drill guide tubes, each guide tube having disposed axially therethrough a drill bit guide tube bore,
   b. inserting a drill bit downward into an upper opening of a first one of said drill bit guide tube bores sufficiently far for the point of said drill bit to contact the upper surface of said bottom wall panel of said junction box shell at a first contact point, c. forming said first clearance hole centered on the contact location of said drill bit point on said bottom wall panel, d. forming said first blind anchor bore with a cutting tool inserted through said first drill guide tube and said first clearance hole, e. repeating steps (b) through (d) using said second drill bit guide tube to form said second clearance hole and said second blind anchor bore, and f. detaching said drill fixture from said junction box.

6. The method of claim 1 wherein said step of fixedly attaching said first stud to said concrete body is further defined as comprising the steps of;

a. inserting a first bolt anchor into said anchor bore, b. securing said first bolt anchor in said first anchor bore, and c. fixedly attaching said first stud to said first bolt anchor.

7. The method of claim 1 wherein said step of fixedly attaching said first stud to said concrete body is further defined as comprising the steps of;

a. attaching said security lid to the upper side of a guide plate, b. preparing at least one of the lower end of said first stud and said anchor bore to receive said stud through said clearance hole though said bottom wall panel into said anchor bore in a manner permitting the upper shank end of said first stud to be displaced from a longitudinal center line of said anchor bore, c. lowering said guide plate and attached security lid to receive an upper end of said shank of said first stud in said bore through said first locking tube, d. fastening said guide plate to said junction box shell, and e. fixedly attaching said first stud to said concrete body.

8. The method of claim 7 wherein said step of preparing at least one of said lower end of said first stud and said anchor bore is further defined as coating an exposed outer surface of at least one of said stud and said anchor bore with a non-solidified adhesive.

9. The method of claim 8 wherein said step of fixedly attaching said first stud to said concrete body is further defined as facilitating solidification of said adhesive.

10. The method of claim 1 wherein said step of fastening said locking tube to said stud is further defined as comprising the steps of;

a. inserting a first cylindrically-shaped compression key tool coaxially downwards into an upper entrance opening of said bore through said locking tube sufficiently far for a first longitudinally disposed drive pin which protrudes downwards from a lower transverse surface of said compression key tool to abut a first axially alignable, axially disposed guide pin which protrudes upwardly from a floating locking pin plate through a first outer axially aligned hole in a fixed perforated locking pin-guide plate fixed within said bore in said locking tube, said floating locking pin guide plate and guide pin being urged upwardly by a compression spring compressed between the upper surface of a centrally perforated spring retainer plate fixed to a lower end of said locking tube, and a lower surface of said floating locking pin plate, b. exerting a downward force on an upper surface of said compression key tool and thereby depressing said upwardly protruding guide pin of said floating locking pin plate flush with the upper surface of said fixed locking pin guide plate, c. threading a locking collar nut onto an upwardly extending end of said anchor stud which protrudes through central coaxially aligned bores through said spring retainer plate, said floating locking pin plate and said fixed locking pin-guide plate, said locking collar nut having extending upwardly into the body of said locking nut from a lower surface thereof at least a first locking pin bore, d. torqueing said locking collar nut threadingly downwards onto said stud until said lower transverse surface of said locking collar nut abuts the upper face of said fixed locking pin-guide plate, e. relieving downward pressure on said compression key tool to thereby enable said first guide pin of said floating locking pin-guide plate to be urged upwards through said hole in said perforated fixed guide plate in response to upward pressure exerted by said compression spring, and f. threadingly loosening said locking collar nut a fraction of a turn sufficient to align said first locking pin bore in the bottom transverse face of said locking collar nut to become axially aligned with a first inner, longer locking pin protruding upwardly from said floating locking pin plate through a first inner axially aligned perforation in said fixed locking pin-guide plate, thus enabling said first locking pin to be urged upwardly into said first locking pin bore in said locking collar nut in response to pressure exerted by said compression spring, thus locking the locking collar nut against rotation.

11. The method of claim 10 wherein said compression key tool includes a second longitudinally disposed drive pin which protrudes downwardly from said lower transverse face of said compression key tool to abut a second axially alignable, axially disposed guide pin which protrudes upwardly from said floating locking pin plate through a second outer axial hole in said fixed perforated locking pin guide plate.

12. The method of claim 11 wherein said second guide pin protrudes from said floating locking pin plate at a location diametrically opposed to that of said first guide pin.

13. The method of claim 12 wherein said locking collar nut includes a second locking pin bore in said bottom transverse face of said locking collar nut, said second locking pin bore being axially alignable with a second, inner longer locking pin protruding upwardly from said floating locking pin plate through a second inner perforation in said fixed locking pin plate.

14. The method of claim 13 wherein said locking pin protrudes from said floating locking pin plate at a location diametrically opposed to that of said first locking pin.

15. The method of claim 10 wherein said downward force on said compression key tool is exerted by threadingly advancing an externally threaded compression ring downwardly into an internally threaded part of said bore in an upper part of said locking tube.

16. The method of claim 15 wherein said threadingly advancement of said compression ring is accomplished by twisting about the longitudinal axis thereof a first tubular spanner wrench which is coaxially and longitudinally slidably receivable into an upper opening of said bore in said locking tube, said first spanner wrench having protruding downwardly from a lower end thereof a pair of diametrically opposed, longitudinally disposed drive pins which are insertably receivable within a pair of axially alignable bores in an annular upper transverse surface of said compression ring.

17. The method of claim 16 wherein said locking collar nut is torqued threadingly downwards on said stud by twisting about the longitudinal axis thereof a second spanner wrench which has a cylindrically-shaped body which is coaxially and longitudinally slidably receivable in a bore through said first spanner wrench, said second spanner wrench having protruding downwardly from a lower end thereof a pair of diametrically opposed, longitudinally disposed drive pins which are insertably receivable within a pair of axially alignable drive bores which extend downwardly into the body of said locking collar nut from an upper transverse face thereof.

18. The method of claim 1 further including the steps of aligning a second clearance hole in said bottom wall of said junction box shell with a second anchor bore in said concrete body, and repeating steps (b) through (f) for a second threaded stud inserted through said second clearance hole.

19. The method of claim 1 wherein said first anchor bore is formed by a tool which is inserted through said first clearance hole.

20. The method of claim 19 further including the steps of forming a second clearance hole and a second anchor bore, and repeating steps (b) through (f) for a second threaded stud inserted through said second clearance hole and said second anchor bore.

21. The method of claim 20 wherein the steps of forming said first and second clearance holes in said bottom wall panel of said junction box are further defined as including the steps of;
   a. attaching a drill fixture to said junction box near an upper open end of said junction box, said drill fixture having a mounting plate disposed transversely to a longitudinal central axis of said junction box shell, said mounting plate having disposed perpendicularly through its thickness dimension a parallel pair of laterally spaced, vertically disposed first and second drill guide tubes, each guide tube having disposed axially therethrough a drill bit guide tube bore,
   b. inserting a drill bit downward into an upper opening of a first one of said drill bit guide tube bores sufficiently far for the point of said drill bit to contact the upper surface of said bottom wall panel of said junction box shell at a first contact point,
   c. forming said first clearance hole centered on the contact location of said drill bit point on said bottom wall panel,
   d. forming said first blind anchor bore with a cutting tool inserted through said first drill guide tube and said first clearance hole,
   e. repeating steps (b) through (d) using said second drill bit guide tube to form said second clearance hole and said second blind anchor bore, and
   f. detaching said drill fixture from said junction box.

22. A kit for use with a wall mountable pull box-type electrical junction box enclosure shell mountable in a concrete body to limit access to the interior of said enclosure and thereby protect against theft of electrical wires interconnected within said enclosure, said kit comprising;
   a locking security lid including,
   a
   (I) an elongated flat base plate,
   (ii) at least a first hollow cylindrically-shaped locking tube which is mounted in a first circular hole through the thickness dimension of said base plate, said locking tube having an upper transverse end co-planar with the upper surface of said base plate, and a tubular body which extends perpendicularly downwards from the lower surface of said base plate, said tubular body having an upper cylindrically-shaped section and an axially aligned lower cylindrically shaped section, and a fixed circular locking pin guide plate fixed within a common bore disposed through said upper and lower sections at the junction therebetween, said fixed circular locking pin guide plate having through its thickness dimension a first outer guide pin, perforation, and a first inner, locking pin perforation, said locking tube including an annular ring-shaped floating locking plate longitudinally slidably located within a lower part of said bore through said locking tube, said ring-shaped floating locking pin plate having protruding perpendicularly upwards, from the upper surface thereof a first, short guide pin axially aligned with said first guide pin perforation through said fixed locking pin guide plate, and a first, long locking pin axially aligned with said locking pin perforation through said locking pin guide plate, said locking tube including at a bottom end thereof a transversely disposed, annular ring-shaped retainer plate and an open-coil helical compression spring disposed between an upper surface of said spring retainer plate and a lower surface of said floating locking pin plate to thus urge said floating locking pin plate upwards to thereby urge said guide pin of said floating locking pin plate upwards through said axially aligned guide pin perforation through said fixed locking pin guide plate, and said locking pin upwards through said axially aligned locking pin perforation through said fixed locking guide plate, said spring retainer plate, floating locking pin plate and fixed locking pin guide plate having through their thicknesses central axially aligned bores for receiving therethrough the threaded shank of an elongated stud anchorable to said concrete body.

23. The kit of claim 22 whereby said first fixed locking pin guide plate of said first locking tube includes a second inner locking pin perforation and said floating locking pin plate has protruding perpendicularly upwards from said upper surface thereof a second inner locking pin which is axially aligned with said second inner locking pin perforation.

24. The kit of claim 23 wherein said second inner locking pin protrudes upwardly from said floating locking pin plate at a location diametrically opposed from that of said first inner locking pin.

25. The kit of claim 24 wherein said fixed locking pin guide plate of said first locking tube includes a second outer guide pin perforation and said floating locking pin plate has protruding upwards from said upper surface thereof a second outer short guide pin which is axially aligned with said second outer guide pin perforation.

26. The kit of claim 25 wherein said second outer guide pin protrudes upwardly from said floating locking pin plate at a location diametrically opposed to that of said first outer guide pin.

27. The kit of claim 25 further including a locking collar nut threadable onto the threaded upper shank end of a stud received upwardly through said central axially aligned bores through said first locking tube, said locking collar nut having extending upwardly into the body thereof from a lower transverse surface thereof at least one pair of diametrically opposed locking pin bores axially alignable with said inner locking pin perforations through said fixed locking pin guide plate to thus enable insertable reception of said pair of locking pins urged upwardly through said locking pin perforations.

28. The kit of claim 27 wherein said locking collar nut is further defined as having extending downwardly into the body of said locking collar nut from an upper transverse surface thereof a pair of drive bores.

29. The kit of claim 28 wherein said locking tube is further defined as having formed in an inner wall surface thereof a helical thread.

30. The kit of claim 29 further including a cylindrically-shaped compression key tool coaxially receivable downwards into a bore through said locking tube from an upper entrance opening of said bore, said compression key tool having protruding downwardly from a lower transverse surface thereof a pair of longitudinally disposed drive pins which are axially alignable with said outer guide pins in said perforations through said fixed locking pin guide plate whereby a downward force exerted on said compression key tool is transmissible from said drive pins to said guide pins and said floating locking pin plate to thus enable said guide pins and said floating locking pin plate to be displaced longitudinally downwards within said locking tube against an upward spring force exerted on a lower surface of said floating locking pin plate by said compression spring.

31. The kit of claim 30 further including a compression ring for exerting a downward force on said compression key tool, said compression ring having on an external longitudinally disposed surface thereof a helical thread threadingly receivable in an internally threaded part of an upper part of a bore through said first locking tube.

32. The kit of claim 31 further including a first tubular compression ring spanner wrench which is coaxially and longitudinally slidably receivable into an upper opening of said bore in said first locking tube, said first spanner wrench having protruding downwardly from a lower end thereof a pair of diametrically opposed, longitudinally disposed drive pins which are insertably receivable within a pair of axially alignable drive pin bores in an upper annular transverse surface of said compression ring.

33. The kit of claim 32 further comprising a second, locking collar nut spanner wrench, said second spanner wrench having a cylindrically-shaped body which is coaxially and longitudinally slidably receivable in a bore through said first spanner wrench, said second spanner wrench having protruding downwardly from a lower end thereof a pair of diametrically opposed, longitudinally disposed drive pins which are insertably receivable within a pair of axially alignable drive bores which extend downwardly into the body of said locking collar nut from an upper transverse face thereof.

34. The kit of claim 33 wherein said tool components of said kit including said compression key tool, compression ring, compression ring spanner wrench and locking collar nut spanner wrench are removably linkable together for transit and storage by placing said compression key tool at a bottom of a stack of said components, placing said compression ring coaxially on top of said compression key tool, placing said first, compression ring spanner wrench on top of said compression ring with drive pins of said first spanner wrench inserted into said drive pin bores of said compression ring, inserting the cylindrical body of said second, locking collar nut spanner wrench downwardly through coaxially aligned bores of said first spanner wrench, said compression ring, and said compression key tool, and releasably inserting a retainer pin transversely through radially disposed and aligned holes through the outer cylindrical wall surfaces of the compression key tool and the second, locking collar-nut spannerwrench.

35. The kit of claim 22 wherein said security lid further includes a second locking tube spaced away from said first locking tube.

36. The kit of claim 22 further including a guide plate for holding said security lid in fixed alignment within an open upper end of a pull box.

37. The kit of claim 36 wherein said guide plate is further defined as including an elongated rectangular base plate having in an upper surface thereof a rectangular recess for receiving and fixedly holding said security lid, at least a first clearance hole through the thickness dimension of said base plate for receiving downwardly therethrough said locking tube of said security lid, a front vertical flange which extends upwardly from a front edge of said base plate and a front horizontal flange which extends forward from the upper edge of said front vertical flange, a rear vertical flange which extends upwardly from a rear edge of said base plate and a rear horizontal flange which extends rearward from the upper edge of said rear vertical flange, said front and rear horizontal flanges being fastenable to upper edges of a pull box shell.

* * * * *